United States Patent
Putnam et al.

(10) Patent No.: US 10,333,781 B2
(45) Date of Patent: Jun. 25, 2019

(54) CHANGING BETWEEN DIFFERENT ROLES AT ACCELERATION COMPONENTS

(71) Applicant: Microsoft Technology Licensing, LLC, Redmond, WA (US)

(72) Inventors: Andrew R. Putnam, Seattle, WA (US); Douglas C. Burger, Bellevue, WA (US); Michael David Haselman, Sammamish, WA (US); Stephen F. Heil, Sammamish, WA (US); Yi Xiao, Redmond, WA (US); Sitaram V. Lanka, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 747 days.

(21) Appl. No.: 14/752,807

(22) Filed: Jun. 26, 2015

(65) Prior Publication Data

US 2016/0308719 A1 Oct. 20, 2016

Related U.S. Application Data

(60) Provisional application No. 62/149,303, filed on Apr. 17, 2015.

(51) Int. Cl.
*G06F 9/50* (2006.01)
*H04L 12/24* (2006.01)

(52) U.S. Cl.
CPC ........ *H04L 41/0816* (2013.01); *G06F 9/5027* (2013.01); *G06F 9/5061* (2013.01)

(58) Field of Classification Search
CPC ... H04L 41/0816; G06F 9/5027; G06F 9/5061
(Continued)

(56) References Cited

U.S. PATENT DOCUMENTS 5,600,845 A   2/1997   Gilson
5,684,980 A   11/1997  Casselman
(Continued)

FOREIGN PATENT DOCUMENTS

CN   101276298 A   10/2008
CN   101545933 B   9/2009
(Continued)

OTHER PUBLICATIONS

"International Search Report & Written Opinion Issued in PCT Application No. PCT/US2016/026291", dated Jun. 20, 2016, 11 Pages.
(Continued)

*Primary Examiner* — Nicholas R Taylor
*Assistant Examiner* — Chong G Kim
(74) *Attorney, Agent, or Firm* — Ranjeev Singh; Singh Law, PLLC

(57) ABSTRACT

Aspects extend to methods, systems, and computer program products for changing between different roles at acceleration components. Changing roles at an acceleration component can be facilitated without loading an image file to configure or partially reconfigure the acceleration component. At configuration time, an acceleration component can be configured with a framework and a plurality of selectable roles. The framework also provides a mechanism for loading different selectable roles for execution at the acceleration component (e.g., the framework can include a superset of instructions for providing any of a plurality of different roles). The framework can receive requests for specified roles from other components and switch to a subset of instructions for the specified roles. Switching between subsets of instructions at an acceleration component is a lower overhead operation relative to reconfiguring or partially
(Continued)

reconfiguring an acceleration component by loading an image file.

20 Claims, 19 Drawing Sheets

(58) Field of Classification Search
USPC .......................................................... 709/221
See application file for complete search history.

(56) References Cited

U.S. PATENT DOCUMENTS

| | | | |
|---|---|---|---|
| 5,748,979 A | 5/1998 | Trimberger | |
| 5,774,668 A | 6/1998 | Choquier et al. | |
| 5,828,858 A | 10/1998 | Athanas et al. | |
| 6,096,091 A | 8/2000 | Hartmann | |
| 6,104,211 A | 8/2000 | Alfke | |
| 6,256,758 B1 | 7/2001 | Abramovici et al. | |
| 6,326,806 B1 | 12/2001 | Fallside et al. | |
| 6,462,579 B1 | 10/2002 | Camilleri et al. | |
| 6,496,971 B1 | 12/2002 | Lesea et al. | |
| 6,526,557 B1 | 2/2003 | Young et al. | |
| 6,530,049 B1 | 3/2003 | Abramovici et al. | |
| 6,573,748 B1 | 6/2003 | Trimberger | |
| 6,874,108 B1 | 3/2005 | Abramovici et al. | |
| 6,915,338 B1 | 7/2005 | Hunt et al. | |
| 6,973,608 B1 | 12/2005 | Abramovici et al. | |
| 6,996,443 B2 | 2/2006 | Marshall et al. | |
| 7,020,860 B1 | 3/2006 | Zhao et al. | |
| 7,036,059 B1 | 4/2006 | Carmichael et al. | |
| 7,111,224 B1 | 9/2006 | Trimberger | |
| 7,146,598 B2 | 12/2006 | Horanzy | |
| 7,224,184 B1 | 5/2007 | Levi et al. | |
| 7,240,127 B2 | 7/2007 | Dubreuil | |
| 7,263,631 B2 | 8/2007 | VanBuren | |
| 7,286,020 B1 | 10/2007 | O et al. | |
| 7,340,596 B1 | 3/2008 | Crosland et al. | |
| 7,382,154 B2 | 6/2008 | Ramos et al. | |
| 7,389,460 B1 | 6/2008 | Demara | |
| 7,444,551 B1 | 10/2008 | Johnson et al. | |
| 7,482,836 B2 | 1/2009 | Levi et al. | |
| 7,500,083 B2 | 3/2009 | Trivedi et al. | |
| 7,546,572 B1 | 6/2009 | Ballagh et al. | |
| 7,620,883 B1 | 11/2009 | Carmichael et al. | |
| 7,685,254 B2* | 3/2010 | Pandya ............. | G06F 17/30985 |
| | | | 370/389 |
| 7,734,895 B1 | 6/2010 | Agarwal et al. | |
| 7,822,958 B1 | 10/2010 | Allen et al. | |
| 7,899,864 B2 | 3/2011 | Margulis | |
| 7,906,984 B1 | 3/2011 | Montminy et al. | |
| 7,925,863 B2 | 4/2011 | Hundley | |
| 7,953,014 B2 | 5/2011 | Toda et al. | |
| 8,018,249 B2 | 9/2011 | Koch et al. | |
| 8,018,866 B1 | 9/2011 | Kasturi et al. | |
| 8,046,727 B2 | 10/2011 | Solomon | |
| 8,054,172 B2 | 11/2011 | Jung et al. | |
| 8,117,497 B1 | 2/2012 | Lesea | |
| 8,117,512 B2 | 2/2012 | Sorensen et al. | |
| 8,127,113 B1 | 2/2012 | Sinha et al. | |
| 8,145,894 B1* | 3/2012 | Casselman ........... | G06F 15/7871 |
| | | | 713/1 |
| 8,159,259 B1 | 4/2012 | Lewis et al. | |
| 8,166,289 B2 | 4/2012 | Owens et al. | |
| 8,171,099 B1 | 5/2012 | Malmskog et al. | |
| 8,250,578 B2 | 8/2012 | Krishnamurthy et al. | |
| 8,368,423 B2 | 2/2013 | Yancey et al. | |
| 8,434,087 B2 | 4/2013 | Degenaro et al. | |
| 8,453,013 B1 | 5/2013 | Chen | |
| 8,516,268 B2 | 8/2013 | Woodall | |
| 8,554,953 B1 | 10/2013 | Sorensen et al. | |
| 8,635,571 B1 | 1/2014 | Goldman | |
| 8,635,675 B2 | 1/2014 | Kruglick | |
| 8,803,876 B2 | 8/2014 | Bohan et al. | |
| 8,803,892 B2 | 8/2014 | Urbach | |
| 8,863,072 B1 | 10/2014 | Jahnke | |
| 8,867,545 B2 | 10/2014 | Viens et al. | |
| 8,901,960 B2 | 12/2014 | Takano et al. | |
| 8,910,109 B1 | 12/2014 | Orthner | |
| 8,924,907 B1 | 12/2014 | Jahnke et al. | |
| 8,997,033 B1 | 3/2015 | Hew | |
| 9,032,343 B1 | 5/2015 | Goldman | |
| 9,313,364 B2 | 4/2016 | Tanaka | |
| 9,361,416 B2 | 6/2016 | Fine et al. | |
| 9,483,291 B1 | 11/2016 | Chen et al. | |
| 9,576,332 B1 | 2/2017 | Streete et al. | |
| 9,647,731 B2 | 5/2017 | Ardalan | |
| 9,652,327 B2 | 5/2017 | Heil et al. | |
| 9,774,520 B1 | 9/2017 | Kasturi et al. | |
| 9,792,154 B2 | 10/2017 | Burger et al. | |
| 9,819,542 B2 | 11/2017 | Burger | |
| 9,912,517 B1 | 3/2018 | Ramalingam et al. | |
| 9,983,938 B2 | 5/2018 | Heil et al. | |
| 10,027,543 B2 | 7/2018 | Lanka et al. | |
| 2002/0161902 A1 | 10/2002 | Mcmahan et al. | |
| 2002/0188832 A1 | 12/2002 | Mirsky et al. | |
| 2003/0033450 A1 | 2/2003 | Appleby-alis | |
| 2004/0081104 A1 | 4/2004 | Pan et al. | |
| 2004/0141386 A1 | 7/2004 | Karlsson | |
| 2005/0097305 A1* | 5/2005 | Doering ............. | G06F 9/30181 |
| | | | 712/226 |
| 2005/0120110 A1 | 6/2005 | Curran-gray et al. | |
| 2006/0015866 A1 | 1/2006 | Ang et al. | |
| 2006/0143350 A1 | 6/2006 | Miloushev et al. | |
| 2007/0200594 A1 | 8/2007 | Levi et al. | |
| 2007/0210487 A1 | 9/2007 | Schroder | |
| 2007/0283311 A1* | 12/2007 | Karoubalis ......... | G06F 17/5054 |
| | | | 326/38 |
| 2008/0028187 A1* | 1/2008 | Casselman ............ | G06F 13/409 |
| | | | 712/37 |
| 2008/0120500 A1 | 5/2008 | Kimmery et al. | |
| 2008/0164907 A1 | 7/2008 | Mercaldi-kim et al. | |
| 2008/0184042 A1 | 7/2008 | Parks et al. | |
| 2008/0270411 A1 | 10/2008 | Sedukhin et al. | |
| 2008/0276262 A1 | 11/2008 | Munshi et al. | |
| 2008/0279167 A1 | 11/2008 | Cardei et al. | |
| 2008/0285581 A1 | 11/2008 | Maiorana et al. | |
| 2008/0307259 A1 | 12/2008 | Vasudevan et al. | |
| 2009/0063665 A1 | 3/2009 | Bagepalli et al. | |
| 2009/0085603 A1 | 4/2009 | Paul et al. | |
| 2009/0147945 A1 | 6/2009 | Doi et al. | |
| 2009/0153320 A1 | 6/2009 | Jung et al. | |
| 2009/0182814 A1 | 7/2009 | Tapolcai et al. | |
| 2009/0187733 A1 | 7/2009 | El-ghazawi | |
| 2009/0189890 A1 | 7/2009 | Corbett et al. | |
| 2009/0210487 A1 | 8/2009 | Westerhoff et al. | |
| 2009/0254505 A1* | 10/2009 | Davis ....................... | G06N 5/04 |
| | | | 706/46 |
| 2009/0278564 A1 | 11/2009 | Dehon et al. | |
| 2010/0011116 A1 | 1/2010 | Thornton et al. | |
| 2010/0046546 A1 | 2/2010 | Ram et al. | |
| 2010/0057647 A1* | 3/2010 | Davis .................. | G06N 99/005 |
| | | | 706/12 |
| 2010/0058036 A1* | 3/2010 | Degenaro ............. | G06F 9/5027 |
| | | | 712/220 |
| 2010/0076915 A1* | 3/2010 | Xu ........................ | G06N 3/063 |
| | | | 706/25 |
| 2010/0083010 A1 | 4/2010 | Kern et al. | |
| 2010/0106813 A1 | 4/2010 | Voutilainen et al. | |
| 2010/0121748 A1 | 5/2010 | Handelman et al. | |
| 2010/0174770 A1* | 7/2010 | Pandya ............. | G06F 17/30985 |
| | | | 709/200 |
| 2010/0251265 A1 | 9/2010 | Hodson et al. | |
| 2011/0068921 A1* | 3/2011 | Shafer .................. | G06K 7/0008 |
| | | | 340/571 |
| 2011/0078284 A1 | 3/2011 | Bomel et al. | |
| 2011/0080264 A1* | 4/2011 | Clare ...................... | G01S 13/82 |
| | | | 340/10.1 |
| 2011/0088038 A1 | 4/2011 | Kruglick | |
| 2011/0153824 A1 | 6/2011 | Chikando et al. | |
| 2011/0161495 A1 | 6/2011 | Ratering et al. | |
| 2011/0178911 A1* | 7/2011 | Parsons ................. | G06Q 40/00 |
| | | | 705/35 |

(56) References Cited

U.S. PATENT DOCUMENTS

| | | | |
|---|---|---|---|
| 2011/0218987 A1* | 9/2011 | Branscome | G06F 17/30442 707/714 |
| 2011/0238792 A1 | 9/2011 | Phillips et al. | |
| 2012/0047239 A1 | 2/2012 | Donahue et al. | |
| 2012/0092040 A1* | 4/2012 | Xu | G06F 17/30675 326/39 |
| 2012/0110192 A1 | 5/2012 | Lu et al. | |
| 2012/0110274 A1 | 5/2012 | Rosales et al. | |
| 2012/0150952 A1 | 6/2012 | Beverly | |
| 2012/0260078 A1 | 10/2012 | Varnum et al. | |
| 2012/0324068 A1 | 12/2012 | Jayamohan et al. | |
| 2013/0055240 A1 | 2/2013 | Gondi | |
| 2013/0151458 A1* | 6/2013 | Indeck | G06N 5/025 706/47 |
| 2013/0152099 A1 | 6/2013 | Bass et al. | |
| 2013/0159452 A1 | 6/2013 | Saldana de fuentes et al. | |
| 2013/0177293 A1* | 7/2013 | Mate | H04N 5/77 386/239 |
| 2013/0182555 A1 | 7/2013 | Raaf et al. | |
| 2013/0205295 A1 | 8/2013 | Ebcioglu et al. | |
| 2013/0226764 A1 | 8/2013 | Battyani | |
| 2013/0227335 A1 | 8/2013 | Dake et al. | |
| 2013/0285739 A1 | 10/2013 | Blaquiere et al. | |
| 2013/0297043 A1 | 11/2013 | Choi et al. | |
| 2013/0305199 A1 | 11/2013 | He et al. | |
| 2013/0314559 A1 | 11/2013 | Kim | |
| 2013/0318277 A1 | 11/2013 | Dalal et al. | |
| 2014/0007113 A1 | 1/2014 | Collin et al. | |
| 2014/0055467 A1 | 2/2014 | Bittner et al. | |
| 2014/0067851 A1* | 3/2014 | Asaad | G06F 17/30442 707/769 |
| 2014/0092728 A1 | 4/2014 | Alvarez-icaza rivera et al. | |
| 2014/0095928 A1 | 4/2014 | Ogasawara et al. | |
| 2014/0115151 A1 | 4/2014 | Kruglick | |
| 2014/0118026 A1 | 5/2014 | Aldragen | |
| 2014/0208322 A1 | 7/2014 | Sasaki et al. | |
| 2014/0215424 A1 | 7/2014 | Fine et al. | |
| 2014/0245061 A1 | 8/2014 | Kobayashi | |
| 2014/0258360 A1* | 9/2014 | Hebert | G06F 9/5038 709/201 |
| 2014/0267328 A1 | 9/2014 | Banack et al. | |
| 2014/0280499 A1 | 9/2014 | Basavaiah et al. | |
| 2014/0282506 A1 | 9/2014 | Cadigan et al. | |
| 2014/0282586 A1 | 9/2014 | Shear et al. | |
| 2014/0310555 A1 | 10/2014 | Schulz et al. | |
| 2014/0351811 A1 | 11/2014 | Kruglick | |
| 2014/0380025 A1 | 12/2014 | Kruglick | |
| 2015/0026450 A1 | 1/2015 | Adiki et al. | |
| 2015/0058614 A1* | 2/2015 | Degenaro | G06F 9/5027 713/100 |
| 2015/0089204 A1 | 3/2015 | Henry et al. | |
| 2015/0100655 A1 | 4/2015 | Pouzin et al. | |
| 2015/0103837 A1 | 4/2015 | Dutta | |
| 2015/0169376 A1 | 6/2015 | Chang et al. | |
| 2015/0186158 A1 | 7/2015 | Yalamanchili et al. | |
| 2015/0199214 A1 | 7/2015 | Lee et al. | |
| 2015/0261478 A1 | 9/2015 | Obayashi | |
| 2015/0271342 A1 | 9/2015 | Gupta et al. | |
| 2015/0339130 A1 | 11/2015 | Kruglick | |
| 2015/0371355 A1 | 12/2015 | Chen | |
| 2015/0373225 A1 | 12/2015 | Tanaka | |
| 2015/0379100 A1 | 12/2015 | Vermeulen | |
| 2016/0087849 A1 | 3/2016 | Balasubramanian et al. | |
| 2016/0147709 A1 | 5/2016 | Franke et al. | |
| 2016/0154694 A1 | 6/2016 | Anderson et al. | |
| 2016/0202999 A1 | 7/2016 | Van den heuvel et al. | |
| 2016/0210167 A1 | 7/2016 | Bolic et al. | |
| 2016/0306667 A1 | 10/2016 | Burger et al. | |
| 2016/0306668 A1 | 10/2016 | Heil et al. | |
| 2016/0306674 A1 | 10/2016 | Chiou et al. | |
| 2016/0306700 A1 | 10/2016 | Heil et al. | |
| 2016/0306701 A1 | 10/2016 | Heil et al. | |
| 2016/0308649 A1 | 10/2016 | Burger et al. | |
| 2016/0308718 A1 | 10/2016 | Lanka et al. | |
| 2016/0308719 A1 | 10/2016 | Putnam et al. | |
| 2016/0328222 A1 | 11/2016 | Arumugam et al. | |
| 2016/0378460 A1 | 12/2016 | Chiou et al. | |
| 2016/0380819 A1 | 12/2016 | Burger | |
| 2016/0380912 A1 | 12/2016 | Burger et al. | |
| 2017/0039089 A1 | 2/2017 | Xia et al. | |
| 2017/0126487 A1* | 5/2017 | Xie | H04L 41/082 |
| 2017/0351547 A1 | 12/2017 | Burger et al. | |

FOREIGN PATENT DOCUMENTS

| | | |
|---|---|---|
| CN | 101783812 A | 7/2010 |
| CN | 102377778 A | 3/2012 |
| CN | 102724478 A | 10/2012 |
| CN | 103246582 A | 8/2013 |
| CN | 103677916 A | 3/2014 |
| EP | 2199910 A1 | 6/2010 |
| EP | 2650786 A2 | 10/2013 |
| JP | 2005235074 A | 9/2005 |
| JP | 2013062566 A | 4/2013 |
| WO | 2013049079 A2 | 4/2013 |
| WO | 2013158707 A1 | 10/2013 |
| WO | 2013167326 A1 | 11/2013 |
| WO | 2013177316 A2 | 11/2013 |
| WO | 2014019428 A1 | 2/2014 |
| WO | 2015026373 A1 | 2/2015 |
| WO | 2015042684 A1 | 4/2015 |

OTHER PUBLICATIONS

Putnam, et al., "A Reconfigurable Fabric for Accelerating Large-Scale Datacenter Services", In Proceedings of ACM/IEEE 41st International Symposium on Computer Architecture, Jun. 14, 2014, 12 pages.

Fahmy, at el., "A Case for FPGA Accelerators in the Cloud", In Proceedings IEEE International System-on-Chip Conference, Nov. 2014, 1 page.

Singh, Satnam., "Computing without Processors", In Proceedings of ACM Computer Architecture, vol. 9, Issue 6, Jun. 27, 2011, 15 pages.

Rath, John., "Microsoft Working on Re-configurable Processors to Accelerate Bing Search", Published on: Jun. 27, 2014 Available at: http://www.datacenterknowledge.com/archives/2014/06/27/programmable-fpga-chips-coming-to-microsoft-data-centers/.

Chen, et al., "Enabling FPGAs in the Cloud", In Proceedings of the 11th ACM Conference on Computing Frontiers, May 20, 2014, 10 pages.

Bharathi, et al., "A Reconfigurable Framework for Cloud Computing Architecture", In Journal of Artificial Intelligence, vol. 6, Issue 1, Jan. 14, 2013, 10 pages.

Wilson, Richard., "Big FPGA design moves to the cloud", Published on: Jun. 11, 2013 Available at: http://www.electronicsweekly.com/news/components/programmable-logic-and-asic/big-fpga-design-moves-to-the-cloud-2013-06/.

Madhavapeddy, et al., "Reconfigurable Data Processing for Clouds", In Proceedings of IEEE 19th Annual International Field-Programmable Custom Computing Machines, May 1, 2011, 5 pages.

Kachris, et al., "A Configurable Mapreduce Accelerator for Multi-Core FPGAs (Abstract only)", In Proceedings of ACM/SIGDA International Symposium on Field-Programmable Gate Arrays, Feb. 26, 2014, 2 pages.

Mamiit, Aaron., "Intel Develops Hybrid Xeon-FPGA Chip for Cloud Services", Published on: Jun. 20, 2014 Available at: http://www.techtimes.com/articles/8794/20140620/intel-develops-hybrid-xeon-fpga-chip-for-cloud-services.htm.

Machidon, et al., "Cloud Perspective on Reconfigurable Hardware", Retrieved on: Feb. 16, 2015, Available at: http://www.afahc.ro/ro/revista/Nr_2_2013/23_Octavian_Mihai_MACHIDON.pdf.

Eguro, et al., "Fpgas for Trusted Cloud Computing", In Proceedings of International Conference on Field-Programmable Logic and Applications, Aug. 2012, 8 pages.

(56) References Cited

OTHER PUBLICATIONS

"International Search Report & Written Opinion Received for PCT Application No. PCT/US2016/026293", dated Jun. 20, 2016, 10 Pages.
"International Search Report and Written Opinion Issued in PCT Application No. PCT/US2016/038837", dated Sep. 16, 2016, 18 Pages.
"International Search Report and Written Opinion Issued in PCT Application No. PCT/US2016/038838", dated Sep. 5, 2016, 12 Pages.
Pell,, et al., "Surviving the end of frequency scaling with reconfigurable dalaftow computing", In ACM SIGARCH Computer Architecture News, vol. 39, Issue 4, Sep. 2011, 6 Pages.
Pereira, et al., "Characterization of FPGA-based High Performance Computers", , Aug. 9, 2011, 134 Pages.
Raaijmakers, et al., "Run-Time Partial Reconfiguration for Removal, Placement and Routing on the Virtex-II Pro", In Proceedings of the International Conference on Field Programmable Logic and Applications, Aug. 27, 2007, 5 Pages.
Rana, et al., "Partial Dynamic Reconfiguration in a Multi-FPGA Clustered Architecture Based on Linux", In the Proceedings of the IEEE International Parallel and Distributed Processing Symposium, Mar. 26, 2007, 8 Pages.
Rehman, et al., "Test and Diagnosis of FPGA Cluster Using Partial Reconfiguration", In Proceedings of the 10th Conference on Ph.D. Research in Microelectronics and Electronics, Jun. 30, 2014,, 4 Pages.
Saldana, et al., "TMD-MPI: An MPI Implementation for Multiple Processors Across Multiple FPGAs", In International Conference on Field Programmable Logic and Applications, Aug. 28, 2006, 6 Pages.
Schadt,, et al., "Computational Solutions to Large-Scale Data Management and Analysis", In Journal of Nature Reviews Genetics, vol. 11, Sep. 2010, 11 Pages.
Slogsnat,, et al., "An Open-Source Hyper Transport Core", in Journal of ACM Transactions on Reconfigurable Technology and Systems, vol. 1, Issue 3, Sep. 2008, 21 Pages.
So,, et al., "A Unified Hardware/Software Runtime Environment for FPGA-Based Reconfigurable Computers using BORPH", In Journal of ACM Transactions on Embedded Computing Systems, vol. 7, Issue 2, Feb. 2008, 28 Pages.
Southard, Dale, "Best Practices for Deploying and Managing GPU Cluster", Retrieved from http://on-demand.gputechconf.com/gtc-express/2012/presentations/deploying-managing-gpu-clusters.pdf, Dec. 18, 2008, 17 Pages.
Stott, "Degradation in FPGAs: Measurement and Modelling", In Proceedings of the 18th Annual ACM/SIGDA International Symposium on Field Programmable Gate Array, Feb. 21, 2010, Feb. 21, 2010, 10 Pages.
Straka, et al., "Modem Fault Tolerant Architectures Based on Partial Dynamic Reconfiguration in FPGAs", In 13th International Symposium on Design and Diagnostics of Electronic Circuits and Systems, Apr. 14, 2010, pp. 173-176.
Stuecheli,, Jeff, "Next Generation POWER Microprocessor", In proceedings of Hot Chips: A Symposium on High Performance Chips, Aug. 2013, 20 Pages.
Sverdlik Yevgeniy "Intel to Offer Hyper-Scale Operators Ability to Reconfigure CPUs on a Dime", Retrieved From: http://www.datacenterknowledge.com/archives/2014/06/19/intel-offer-hyper-scale-operators-ability-reconfigure-cpusdime, Jun. 19, 2014, 3 Pages.
Tan, et al., "A Case for FAME: FPGA Architecture Model Execution", In ACM SIGARCH, Computer Architecture News, vol. 38, No. 3,, Jun. 19, 2010, pp. 290-301.
Tan,, et al., "Datacenter-Scale Network Research on FPGAs", In Proceedings of the Exascale Evaluation and Research Techniques Workshop, 2011, 6 Pages.
Unnikrishnan,, et al., "Reconfigurable Data Planes for Scalable Network Virtualization", in IEEE Transactions on Computers, vol. 62, No. 1, Jan. 2013, 14 Pages.
Vanderbauwhede,, et al., "FPGA-accelerated Information Retrieval: High-Efficiency Document Filtering", In Proceedings of the International Conference on Field Programmable Logic and Applications, Aug. 2009, 6 Pages.
Vaz,, et al., "Deferring Accelerator Offloading Decisions to Application Runtime", in Proceedings of the International Conference on ReConFigurable Computing and FPGAs, Apr. 24, 1994, 8 Pages.
Wittig, et al., "OneChip: An FPGA Processor With Reconfigurable Logic", In Department of Computer and Electrical Engineering,University of Toronto, Apr. 17, 1996, 10 Pages.
Yan, et al., "Efficient Query Processing for Web Search Engine with FPGAs", In Proceedings of the IEEE 20th International Symposium on Field-Programmable Custom Computing Machines, Jun. 14, 2014, 4 Pages.
Yin,, "Customizing Virtual Networks with Partial FPGA Reconfiguration", In Proceedings of the Second ACM SIGCOMM Workshop on Virtualized Infrastructure Systems and Architectures, Sep. 2010, 8 Pages.
"Accelium™ 3700 Coprocessor", Retrieved From http://drccomputer.com/downloads/DRC%20Accelium%203700%20Datasheet%20-%200ct%202013.pdf, Mar. 4, 2015, 1 Page.
"Altera and Baidu Collaborate on FPGA-Based Acceleration for Cloud Datacenters", Retrieved From: http://www.hpcwire.com/off-the-wire/altera-baidu-collaborate-fpga-based-acceleration-cloud-datacenters-2/, Sep. 24, 2014, 5 Pages.
"Altera and IBM Unveil FPGA-Accelerated Power Systems", Retrieved From: http://www.hpcwire.com/off-the-wire/altera-ibm-unveil-fpga-accelerated-power-systems/, Nov. 17, 2014, 5 Pages.
"Altera Programmable Logic is Critical DNA in Software Defined Data Centers", Retrieved From: http://newsroom.altera.com/press-releases/altera-microsoft-datacenter.htm, Jun. 16, 2014, 2 Pages.
"An Introduction to the Intel Quickpath Interconnect", Retrieved From: http://www.inlel.in/content/dam/doc/white-paper/quick-path-interconnect-introduction-paper.pdf, Jan. 2009, 22 Pages.
"An Introduction to the NI Lab VIEW RIO Architecture", Retrieved From: http://www.ni.com/white-paper/10894/en, Jan. 28, 2015, 4 Pages.
"BEE42 Hardware Platform", Retrieved From: <<Http://beecube.com/downloads/BEE42pages.pdf>>, Feb. 26, 2015, 2 Pages.
"Cisco UCS C240-M3 Rack Server with NVIDIA GRID GPU cards on Citrix XenServer 6.2 and XenDesktop 7.5", Retrieved From: http://www.cisco.com/c/en/us/products/collateral/servers-unified-computing/ucs-c-series-rack-servers/Whitepaper_C11-732283.pdf, Jul. 2014, 38 Pages.
"Cray XD1 Datasheet", Retrieved From http:l/www.carc.unm.edu/-tlthomas/buildoui/Cray_XD1_Datasheel.pdf, Mar. 4, 2015, 6 Pages.
"Final Office Action Issued in U.S. Appl. No. 14/717,788", dated May 2, 2017, 18 Pages.
"Final Office Action Issued in U.S. Appl. No. 14/717,788", dated Nov. 6, 2017, 18 Pages.
"How Microsoft Designs its Cloud-Scale Servers", Retrieved From: http://download.microsoft.com/download/5/7/61576F498A-2031-4F35-A156-BF8DB1ED3452/How_MS_designs_its_cloud_scale_servers_strategy_paper.pdf>, Feb. 26, 2015,, 6 Pages.
"IBM PureData System for Analytics N2001", Retrieved From: http://public.dhe.ibm.com/common/ssi/ecm/wa/en/wad12353usen/WAD12353USEN.PDF, Feb. 26, 2015, 8 pages.
"International Preliminary Report on Patentability Issued in PCT Patent Application No. PCT/ US2016/026285", dated Oct. 26, 2017, 12 Pages.
"MicroBlaze Processor Reference Guide, Embedded Development Kit", Retrieved From: http://www.xilinx.com/support/documentation/sw_manuals/xilinx14_2/mb_ref_guide.pdf, 2012, 256 Pages.
"Non-Final Office Action Issued in U.S. Appl. No. 14/752,793", dated Aug. 11, 2017, 10 Pages.
"QP: A Heterogeneous Multi-Accelerator Cluster", in Proceedings of the 10th LCI International Conference on High-Performance Clustered Computing, Mar. 2009, 8 pages.
Niu, et al., "Reconfiguring Distributed Applications in FPGA Accelerated Cluster with Wireless Networking", IEEE 21st International Conference on Field Programmable Logic and Applications, 2011, 2011, 6 Pages.

(56) References Cited

OTHER PUBLICATIONS

"Secure Computing Architecture", Retrieved From: http://www.syprisresearch.com/home/secure-computing-architectur, Feb. 23, 2015, 4 Pages.
"SRC MAPstation Systems", Retrieved From: http://www.srccomp.com/sites/default/files/pdf/SRC7_MAPstation_70000-AG.pdf, Feb. 26, 2015, 2 Pages.
"Stratix V Device Handbook", available at <<http://www.altera.com/literature/hb/stratix-v/stx5_core.pdf and http://www.16altera.com/literature/hb/stratix-v/stx5_xcvr.pdf>>, vols. 1 and 2, Altera Corporation, San Jose, CA, Sep. 30, 2014, 563 Pages.
"The Convey HC-2 Computer: Architectural Overview", Retrieved From: http://www.conveycomputer.com/index.php/download_file/view/143/142/, 2012, 10 pages.
"Non-Final Office Action Issued in U.S Appl. No. 14/717,680", dated Jan. 11, 2017, 11 Pages.
"Final Office Action Issued in U.S. Appl. No. 14/717,721", dated Apr. 5, 2017, 33 Pages.
"Final Office Action Issued in U.S. Appl. No. 14/717,752", dated Feb. 9, 2017, 14 Pages.
"Non-Final Office Action Issued in U.S. Appl. No. 14/717,752", dated Nov. 7, 2016, 16 Pages.
"Non Final Office Action Issued in U.S. Appl. No. 14/717,788", dated Jan. 31, 2018, 18 Pages.
"Non-Final Office Action Issued in U.S. Appl. No. 14/717,788", dated Aug. 22, 2017, 17 Pages.
"Non-Final Office Action Issued in U.S. Appl. No. 14/717,788", dated Jan. 25, 2017, 20 Pages.
"Final Office Action Issued in U.S. Appl. No. 14/717,721", dated Jun. 29, 2018, 51 Pages.
"Non Final Office Action Issued in U.S. Appl. No. 14/717,721", dated Jan. 24, 2018, 40 Pages.
"Non Final Office Action Issued in U.S. Appl. No. 14/717,721", dated Jan. 27, 2017, 25 Pages.
"Non-Final Office Action Issued in U.S. Appl. No. 14/752,778", dated Feb. 2, 2017, 23 Pages.
"Non-Final Office Action Issued in U.S. Appl. No. 14/752,785", dated Aug. 11, 2016, 29 Pages.
"Final Office Action Issued in U.S. Appl. No. 14/752,800", dated Nov. 8, 2017, 14 Pages.
"Non Final Office Action Issued in U.S. Appl. No. 14/752,800", dated May 3, 2018, 13 Pages.
"Non-Final Office Action Issued in U.S. Appl. No. 14/752,800", dated May 9, 2017, 12 Pages.
"Final Office Action Issued in U.S. Appl. No. 14/752,802", dated Jul. 7, 2017, 18 Pages.
"Non-Final Office Action Issued in U.S. Appl. No. 14/752,802", dated Feb. 10, 2017, 28 Pages.
"Final Office Action Issued in U.S. Appl. No. 14/752,785", dated Jul. 12, 2018, 19 Pages.
"Non Final Office Action Issued in U.S. Appl. No. 14/752,785", dated Feb. 23, 2018, 17 Pages.
"Office Action Issued in European Patent Application No. 16719599.9", dated Aug. 9, 2018, 05 Pages.
"Office Action Issued in European Patent Application No. 16719604.7", dated Aug. 9, 2018, 7 Pages.
"Office Action Issued in European Patent Application No. 16719605.4", dated Aug. 9, 2018, 5 Pages.
Abel, et al., "Increasing Design Changeability using Dynamical Partial Reconfiguration", Proceedings of the 16th IEEE NPSS Real Time Conference, May 10, 2009, 7 Pages.
Alachiotis,, et al., "Efficient PC-FPGA Communication Over Gigabit Ethernet", in Proceedings of the 10th IEEE International Conference on Computer and Information Technology, Jun. 2010, 8 Pages.
Alder et al., "Leap Scratchpads: Automatic Memory and Cache Management for Reconfigurable Logic", In Proceedings of the 19th ACM/SIGDA International Symposium on Field Programmable Gate Arrays, Feb. 2011, 4 Pages.

Baxter et al., "Maxwell—a 64 FPGA Supercomputer", In Proceedings of the Second NASA!ESA Conference on Adaptive Hardware and Systems, 8 Pages.
Blott, "Dataflow Architectures for 10Gbps Line-Rate Key-Value Stores", In Proceedings of the Symposium on High Performance Chips, Aug. 25, 2013, 25 Pages.
Bolchini, et al., "A Reliable Reconfiguration Controller for Fault-Tolerant Embedded Systems on Multi-FPGA 29 Platforms", In Proceedings of the IEEE 25th International Symposium on Defect and Fault Tolerance in VLSI Systems, D Oct. 6, 2010, Oct. 6, 2010, 9 Pages.
Burger, et al., "Providing Services in a System having a Hardware Acceleration Plane and a Software Plane", , 118 Pages.
Caulfield, "A Cloud-Scale Acceleration Architecture", In 49th Annual IEEE/ACM International Symposium on Microarchitecture, Oct. 15, 2015, 13 Pages.
Cervero et al., "A resource manager for dynamically reconfigurable FPGA-based embedded systems", In Proceedings of the Euromicro Conference on Digital System Design, Sep. 2013, 8 Pages.
Chalamalasetti et al., "Evaluating FPGA-Acceleration for Real-time Unstructured Search", In Proceedings of the IEEE International Symposium on Performance Analysis of Systems & Software, Apr. 2012, 10 Pages.
Chiou, et al., "Handling Tenant Requests in a System that Uses Acceleration Components", U.S. Appl. No. 14/717,752, filed May 20, 2015, 120 Pages.
Chung et al., "CoRAM: An In-Fabric Memory Architecture for FPGA-based Computing", In Proceedings of the 19th ACM/SIGDA International Symposium on Field Programmable Gate Arrays, Feb. 2011, 10 pages.
Conger, "FPGA Design Framework for Dynamic Partial Reconfiguration", In Proceedings of 15th Reconfigurable Architectures Workshop, Apr. 14, 2008, 8 Pages.
Corbetta, et al., "Two Novel Approaches to Online Partial Bitstream Relocation in a Dynamically Reconfigurable System", In the Proceedings of IEEE Computer Society Annual Symposium on VLSI, Mar. 9, 2007, 2 Pages.
Edward, Stoti A.., "Degradation Analysis and Mitigation in Field Programmable Gate Arrays", In thesis Presented for the Degree of Doctor of Philosophy, Sep. 2011, Sep. 2011, 35 Pages.
Emmert, et al., "Online Fault Tolerance for FPGA Logic Blocks", In IEEE Transactions on Very Large Scale Integration(VLSI) Systems, vol. 15, Issue 2, Feb. 2007, pp. 216-226.
Eshelman,, DJ,, "Think You Don't Need GPUs in the Datacenter? Think Again", Retrieved From: http://www.gtri.com/think-you-dont-need-gpus-in-the-datacenter-think-again/, Jul. 23, 2014, 9 Pages.
Estlick., et al., "Algorithmic Transformations in the Implementation of K-Means Clustering on Reconfigurable Hardware", In Proceedings of the ACM/SIGDA Ninth International Symposium on Field Programmable Gate Arrays, Feb. 2001,, 8 Pages.
Gazzano,, et al., "Integrating Reconfigurable Hardware-Based Grid for High Performance Computing", In Scientific World Journal, vol. 2015, Apr. 8, 2015, 15 Pages.
George et al., "Novo-G: Al the Forefront of Scalable Reconfigurable Supercomputing", in Journal of Computing in Science & Engineering, vol. 13, Issue 1,, Jan. 2011,, 5 Pages.
Hammad, et al., "Highly Expandable Reconfigurable Platform using Multi-FPGA based Boards", In International Journal of Computer Applications, vol. 51 No. 12, Aug. 2012, 6 Pages.
Harikrishna, et al., "A Novel online Fault Reconfiguration of FPGA", Proceedings of the Indian Journal of Applied Research, vol. 3, Issue 8, pp. 195-198, 4 Pages.
Hussain,, et al., "Highly Parameterized K-means Clustering on FPGAs: Comparative Results with GPPs and GPUs", in Proceedings of the International Conference on Reconfigurable Computing and FPGAs, Nov. 2011, 6 Pages.
Inoue,, et al., "20Gbps C-Based Complex Event Processing", In Proceedings of the 2011 21st International Conference on Field Programmable Logic and Applications, 2011, 6 Pages.
Jamuna, et al., "Fault Tolerant Tecniques for Reconfigurable Devices: a brief Survey", In International Journal Application or Innovation in Engineering & Management, vol. 2, Issue 1,, Jan. 2013, 6 Pages.

(56) References Cited

OTHER PUBLICATIONS

Jun et al., "Scalable Multi-Access Flash Store for Big Data Analytics", in Proceedings of 22nd ACM/SIGDA International Symposium on Field-Programmable Gate Arrays, Feb. 26, 2014, 10 Pages.
Kachris,, et al., "A Reconfigurable MapReduce Accelerator for Multi-Core All-Programmable SoCs", in Proceedings of the International Symposium on System-on-Chip, Oct. 28, 2014, 6 Pages.
Kearney, et al., "Using simulated partial dynamic run-time reconfiguration to share embedded FPGA compute and power resources across a swarm of unpiloted airborne vehicles", In EURASIP Journal on Embedded Systems, vol. 2007, Feb. 21, 2007, 12 Pages.
Khalilzad et al., "FPGA implementation of Real-time Ethernet communication using RMII Interface" In Proceedings of the IEEE 3rd International Conference on Communication Software and Networks, May 2011, 7 Pages.
Kim, "Polymorphic On-Chip Networks", In 35th International Symposium on Computer Architecture, Jun. 21, 2008, pp. 101-112.
Kirchgessner et al., "VirtuaiRC: A Virtual FPGA Platform for Applications and Tools Portability", In Proceedings of the ACM/SIGDA International Symposium on Field Programmable Gate Arrays, Feb. 2012,, 4 Pages.
Kohn "Partial reconfiguration of a hardware accelerator on zynq-7000 all programmable soc devices", In Application Note: Zynq-7000 All Prgrammable SoC, vol. XAPP1159, No. UG1159, Janaury 21, 2013, 19 Pages.
Krieg, et al., "Run-Time Fpga HEALTH Monitoring using Power Emulation Techniques", In Proceedings of the IEEE 54th International Midwest Symposium on Circuits and Systems, Aug. 7, 2011, 4 Pages.
Lavasani,, et al., "An FPGA-based In-line Accelerator for Memcached", in IEEE Computer Architecture Letters, vol. 13, No. 2, Jul. 15, 2003, 4 Pages.
Macvitiie,, et al., "Hardware Acceleration Critical Component for Cost-Conscious Data Centers", Retrieved From: https://devcentral.f5.com/articles/hardware-acceleration-critical-component-for-cost-conscious-data-centers, Mar. 24, 2009, 10 Pages.
Markettos et al., "Interconnect for commodity FPGA clusters: standardized or customized?", In Proceedings of the 24th International Conference on Field Programmable Logic and Applications, Sep. 2, 2014, 8 Pages.
Martin et al., "FPGA-Based Application Acceleration: Case Study with GZIP Compression/Decompression Streaming Engine", In ICCAD Special Session 7C, Nov. 2013, 1 Page.
McLoughlin, et al., "Achieving Low-cost High-reliability Computation Through Redundant Parallel Processing", In Proceedings of International Conference on Computing & Informatics, Jun. 6, 2006, 6 Pages.
Mershad, et al., "A Framework for Multi-cloud Cooperation with Hardware Reconfiguration Support", In the Proceedings of IEEE Ninth World Congress on Services, Jun. 28, 2013, pp. 52-59.
Mesquita, et al., "Remote and Partial Reconfiguration of FPGAs: tools and trends", In Proceedings of the International Parallel and Distributed Processing Symposium, Apr. 22, 2003, 8 Pages.
Moorhead,, Patrick, "Moving Beyond CPUs in the Cloud: Will FPGAs Sink or Swim?", Retrieved From: http://www.moorinsightsstrategy.com/wp-content/uploads/2014/12/Moving-Beyond-CPUs-in-the-Cioud-Wiii-FPGAs-Sink-or-Swim-by-Moor-Insights-and-Strategy.pdf, Dec. 2, 2014, 5 Pages.
Morris,, Kevin,, "FPGAs Cool Off the Datacenter", Retrieved From <<www.eejournal.com/archives/articles/20141118-datacenter>>, Nov. 18, 2014, 5 Pages.
Mysore, et al., "Portland: a Scalable Fault-Tolerant Layer 2 Data Center Network Fabric", In ACM SIGCOMM Computer Communication Review, vol. 39, No. 4,, Aug. 16, 2009, 12 Pages.
Oden, et al., "GGAS: Global GPU Address Spaces for Efficient Communication in Heterogeneous Clusters", In Proceedings of the IEEE International Conference on Cluster Computing, Sep. 23, 2013, 8 Pages.

Papadimitriou, et al., "Performance of Partial Reconfiguration in FPGA Systems; A Survey and a Cost Model", In ACM Transactions on Reconfigurable Technology and Systems, vol. 4, No. 4, Dec. 1, 2011, 24 Pages.
Paulsson, et al., "Exploitation of Run-Time Partial Reconfiguration for Dynamic Power Management in Xilinx Spartan III-based Systems", In Proceedings of the 3rd International Workshop on Reconfigurable Communication-centric Systems-on-Chip, Jun. 2007, 6 Pages.
PCT/ US2016/038841, "International Search Report and Written Opinion in PCT Application No. PCT/US2016/038841", dated Sep. 28, 2016, 18 Pages.
"International Search Report & Written Opinion Issued in PCT Application No. PCT/US2016/026284", dated Jun. 20, 2016, 13 Pages.
"International Search Report & Written Opinion Issued in PCT Application No. PCT/US2016/026285", dated Jun. 23, 2016, 16 Pages.
"International Preliminary Report on Patentability Issued in PCT Application No. PCT/US2016/026286", dated May 24, 2017, 11 Pages.
"International Search Report and Written Opinion Issued in PCT Application No. PCT/US2016/026286", dated Jul. 4, 2016 15 Pages.
"Second Written Opinion Issued in PCT Application No. PCT/US2016/026286", dated Oct. 14, 2016, 9 Pages.
"International Search Report and Written Opinion Issued in PCT Application No. PCT/US2016/026287", dated Jul. 4, 2016, 16 Pages. 17 Pages.
"International Preliminary Report on Patentability Issued in PCT Application No. PCT/US2016/026290", dated Mar. 13, 2017, 8 Pages.
"International Search Report & Written Opinion Issued in PCT Application No. PCT/US2016/026290", dated Jun. 20, 2016, 12 Pages.
"International Preliminary Report on Patentability Issued in PCT Application No. PCT/US2016/026293", dated Mar. 13, 2017, 8 Pages.
"Notice of Allowance Issued in U.S. Appl. No. 14/717,757", dated Oct. 4, 2018, 6 Pages.
"Notice of Allowance Issued in U.S. Appl. No. 14/752,785", dated Sep. 21, 2018, 10 Pages.
"Notice of Allowance Issued in U.S. Appl. No. 14/752,785", dated Oct. 10, 2018, 9 Pages.
Bolchini, Cristiana, et al., "TMR and Partial Dynamic Reconfiguration to mitigate SEU faults in FPGAs", In Proceedings of the 22nd IEEE International Symposium on in Defect and Fault-Tolerance in VLSI Systems, Sep. 26, 2007, pp. 87-95.
Danek, et al., "Increasing the Level of Abstraction in Fpga-Based Designs", In Proceedings of International Conference on Field Programmable Logic and Applications, Sep. 23, 2008, pp. 5-10.
Emmert, et al., "Dynamic Fault Tolerance in FPGAs via Partial Reconfiguration", In Proceedings of IEEE Symposium on Field-Programmable Custom Computing Machines, Apr. 17, 2000, pp. 165-174.
Heiner, Jonathan, et al., "Fpga Partial Reconfiguration Via Configuration Scrubbing", In Proceedings of the International Conference on in Field Programmable Logic and Applications, Aug. 31, 2009, pp. 99-104.
Horta, Edson L.., et al., "Dynamic Hardware Plugins in an FPGA with Partial Run-time Reconfiguration", In Proceedings of the 39th annual Design Automation Conference, Jun. 2002, pp. 343-348.
Li, et al., "Configuration Prefetching Techniques for Partial Reconfigurable Coprocessor", In Proceedings of the ACM/SIGDA tenth international symposium on Field-programmable gate arrays, Feb. 24, 2002, pp. 187-195.
Lie, et al., "Dynamic partial reconfiguration in FPGAs", In Proceedings of Third International Symposium on Intelligent Information Technology Application, Nov. 21, 2009, pp. 445-448.
Lysaght, Patrick, et al., "Invited Paper: Enhanced Architectures, Design Methodologies and CAD Tools for Dynamic Reconfiguration of Xilinx FPGAS", In International Conference on In Field Programmable Logic and Applications, Aug. 28, 2006, pp. 1-6.

(56) References Cited

OTHER PUBLICATIONS

Rani, Sheeba J.., et al., "Fpga Based Partial Reconfigurable Fir Filter Design", In Proceedings of the IEEE International Conference on in Advance Computing, Feb. 21, 2014, pp. 789-792.

Steiger, et al., "Operating Systems for Reconfigurable Embedded Platforms", In Journal of IEEE Transactions on Computers, vol. 53, Issue 11, Nov. 2004, pp. 1393-1407.

* cited by examiner

CHANGING BETWEEN DIFFERENT ROLES AT ACCELERATION COMPONENTS

CROSS-REFERENCE TO RELATED APPLICATIONS

This application claims the benefit of U.S. Provisional Patent Application Ser. No. 62/149,303, entitled "Changing Between Different Programmed Functionalities At An Acceleration Component", filed Apr. 17, 2015 which is incorporated herein in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

BRIEF SUMMARY

Examples extend to methods, systems, and computer program products for changing between different roles at an acceleration component. Instructions are received to implemented service acceleration in accordance with a specified model. A group of interoperating acceleration components is transitioned to the specified model. The group of interoperating acceleration components are included a hardware acceleration plane. The group of interoperating acceleration components is transitioned by switching roles at each acceleration component in the group of interoperating acceleration components.

For each acceleration component in the group of interoperating acceleration components, a role to be provided at the acceleration component is determined The role corresponds to the specified model. For each acceleration component in the group of interoperating acceleration components, a subset of instructions, that can implement the role, is identified at the acceleration component. The subset of instructions is selected from among a superset of instructions that can provide any of a plurality of different roles at the acceleration component.

For each acceleration component in the group of interoperating acceleration components, the acceleration component is altered to provide the role by transitioning the acceleration component to execute the identified subset of instructions. The roles at each acceleration component are linked to compose a graph that provides service acceleration in accordance with the specified model.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
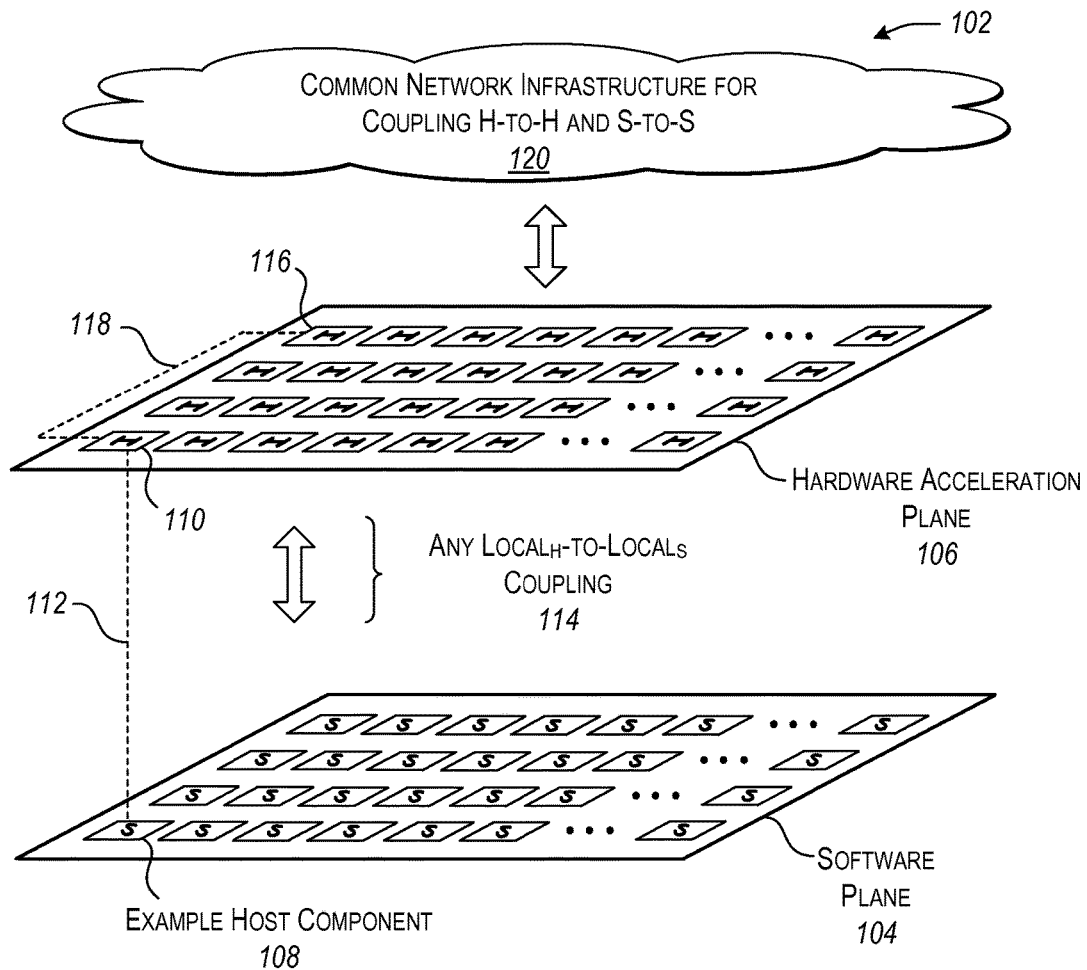
FIG. 1 illustrates an example architecture that includes a software plane and a hardware acceleration plane.

Examples extend to methods, systems, and computer program products for changing between different roles at an acceleration component. Instructions are received to implemented service acceleration in accordance with a specified model. A group of interoperating acceleration components is transitioned to the specified model. The group of interoperating acceleration components are included a hardware acceleration plane. The group of interoperating acceleration components is transitioned by switching roles at each acceleration component in the group of interoperating acceleration components.

For each acceleration component in the group of interoperating acceleration components, a role to be provided at the acceleration component is determined The role corresponds to the specified model. For each acceleration component in the group of interoperating acceleration components, a subset of instructions, that can implement the role, is identified at the acceleration component. The subset of instructions is selected from among a superset of instructions that can provide any of a plurality of different roles at the acceleration component.

For each acceleration component in the group of interoperating acceleration components, the acceleration component is altered to provide the role by transitioning the acceleration component to execute the identified subset of instructions. The roles at each acceleration component are linked to compose a graph that provides service acceleration in accordance with the specified model.

Implementations may comprise or utilize a special purpose or general-purpose computer including computer hardware, such as, for example, one or more processors and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, PDAs, tablets, pagers, watches, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and the following claims, an "acceleration component" is defined as a hardware component specialized (e.g., configured, possibly through programming) to perform a computing function more efficiently than software running on general-purpose central processing unit (CPU) could perform the computing function. Acceleration components include Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices.

In this description and in the following claims, a "role" is defined as functionality provided by an acceleration component to a group of interoperating acceleration components used to accelerate a service. Roles at each acceleration component in a group of interoperating acceleration components can be linked together to compose a graph that provides the service acceleration.

In this description and in the following claims, a "graph" is defined as a group of interconnected (e.g., network connected) acceleration components providing acceleration for a service wherein each acceleration component in the group provides a portion of the acceleration functionality.

In this description an in the following claims, an "image" is defined as a file including information that can be used in configuration of an acceleration component, such as, for example, an FPGA. Information included in an image file can be used to program hardware components of an acceleration component (e.g., logic blocks and reconfigurable interconnects of an FPGA) to implement desired functionality. Desired functionality can be implemented to solve virtually any problem which is computable.

In this description and in the following claims, a "neighbor acceleration component" is defined as an acceleration component configured to exchange input and/or output with another acceleration component when interconnected to the other acceleration component within a graph. Neighbor is viewed logically from the perspective of the graph. The physical proximity of an acceleration component relative to another acceleration component is not a determining factor in identifying neighbor acceleration components. That is, acceleration components that are not physically adjacent to one another (or even near to one another on a network or within a datacenter) can be configured to exchange data with one another when interconnected within a graph. Acceleration components interconnected within a graph can be viewed as neighbor acceleration components even if data exchanged between the acceleration components physically passes through other acceleration components outside of the graph or through host components in transit between the acceleration components. However, acceleration components that are physically adjacent or near to one another on a network or in a datacenter and are interconnected within a graph can also be viewed as neighbor acceleration components with respect to one another.

In general, an acceleration component can include an array of programmable logic blocks and hierarchy of reconfigurable interconnects that allow logic blocks to be connected together in different configurations to provide different functionality (i.e., different roles). Image files can be received and loaded at an acceleration component to configure programmable logic blocks and configure interconnects to provide desired functionality (i.e., roles).

In some environments, applications (services) are provided to a client from a data center. A data center includes multiple (and potentially a very large number of) software-driven general purpose computing devices. Each general purpose computing device can include one or more central processing units (CPUs) that process machine-readable instructions to perform specified computing activities. The multiple general purpose computing devices are networked to one another such that the combined power of the multiple general purpose computer systems (or subsets thereof) can be used to perform more complex computing activities.

Data center providers face continuing challenges to increase processing capabilities and efficiency within and provided by data centers. Continuing to add more and more general purpose computing devices is not feasible due at least in part to power limitations. Computing device specialization is one option. For example, computing devices can be specialized for specific scale workloads to provide some efficiency gains. However, computing device specialization is problematic for at least two reasons. First, lack of homogeneity in a data center increases management issues and provides inconsistent platforms for applications to rely on. Further, data center services evolve rapidly, making non-programmable hardware features impractical. Thus, data center providers need continued improvements in performance and efficiency but cannot obtain those improvements from general purpose computing devices.

Aspects facilitate changing functionality at an acceleration component without loading an image file to configure or partially reconfigure the acceleration component. At configuration time, an acceleration component can be configured with a framework and a plurality of selectable roles. The framework can be executed at the acceleration component and data representing the plurality of selectable roles stored in memory (e.g., in Dynamic Random Access Memory (DRAM)) at the acceleration device. The framework provides core instructions that are common between the plurality of roles. The framework also provides a mechanism for loading different selectable roles from memory for execution at the acceleration device. The framework can receive requests for specified roles from other components and load data representing the specified roles from memory for execution.

Alternately, at configuration time, an acceleration component can be configured with the framework. The framework is executed at the acceleration device. The framework includes a super set of instructions including instructions for providing any of plurality of roles. Different subsets instructions from the super set of instructions can be activated to provide different roles from among the plurality of selectable roles. The framework can receive configuration data from other components (e.g., over a Peripheral Component Interconnect Express (PCIe)) designating a specified role. In response to the configuration data, the framework activates an appropriate subset of instructions to provide the specified role. When switching between selectable roles, a subset of instructions for a current role can be deactivated.

The framework can receive requests for specified roles from other components. In response, the framework can request configuration data for the selectable role from a known location (e.g., from a locally linked host component)

Accordingly, aspects can be used to: (a) allow software services to determine a mix of acceleration component images to support a service, (b) match acceleration component images to services, (c) load models in an acceleration component, (d) reload models from DRAM or PCIe, (e) group jobs indicated for a specific model, (f) uses a single acceleration component to handle multiple computations and perform tuning of those computations, (g) reconfigure an acceleration component, and (h) burn a model into acceleration component image with minimum amount of information to provide the right level of details.

In general, a data center deployment includes a hardware acceleration plane and a software plane. The hardware acceleration plane can include a plurality of networked acceleration components (e.g., FPGAs). The software plane can include a plurality of networked software-implemented host components (e.g., central processing units (CPUs)). A network infrastructure can be shared between the hardware acceleration plane and the software plane. In some environments, software-implemented host components are locally linked to corresponding acceleration components.

FIG. 1 illustrates an example architecture 102 that includes a software plane 104 and a hardware acceleration plane 106. The software plane 104 includes a collection of software-driven components (each denoted by the symbol "S") while the hardware plane includes a collection of hardware acceleration components (each denoted by the symbol "H"). For example, each host component may correspond to a server computer that executes machine-readable instructions using one or more central processing units (CPUs). Each CPU, in turn, may execute the instructions on one or more hardware threads. Each acceleration component can execute hardware logic for implementing functions, such as, for example, portions of services offer by a data center.

Hardware acceleration plane 106 can be constructed using a heterogeneous collection of acceleration components, including different types of acceleration components and/or the same type of acceleration components with different capabilities. For example, hardware acceleration plane 106 can include FPGA devices having different respective processing capabilities and architectures, a mixture of FPGA devices and other devices, and so on. Hardware acceleration plane 106 provides a reconfigurable fabric of acceleration components.

A host component generally performs operations using a temporal execution paradigm (i.e., sequentially) by using each of its CPU hardware threads to execute machine-readable instructions, one after the after. In contrast, an acceleration component may perform operations using a spatial paradigm (i.e., concurrently) by using a large number of parallel logic elements to perform computational tasks. Thus, an acceleration component can perform some operations in less time compared to a software-driven host component. In the context of the architecture 102, the "acceleration" qualifier associated with the term "acceleration component" reflects its potential for accelerating the functions that are performed by the host components.

In one example, architecture 102 corresponds to a data center environment that includes a plurality of computer servers. The computer servers correspond to the host components in the software plane 104. In another example, architecture 102 corresponds to an enterprise system. In a further example, the architecture 102 corresponds to a user device or appliance which uses at least one host component that has access to two or more acceleration components, etc. Other implementations for architecture 102 are also possible.

Common network infrastructure 120 couples host components in the software plane 104 to other host components and couples acceleration components in the hardware acceleration plane 106 to other acceleration components. That is, host components can use common network infrastructure 120 to interact with one another and acceleration components can use common network infrastructure 120 to interact with one another. Interaction among host components in the software plane 104 is independent of the interaction among acceleration components in the hardware acceleration plane 106. As such, two or more acceleration components may communicate in a transparent manner relative to host components in the software plane 104, outside the direction of the host components, and without the host components being "aware" of particular interaction is even taking place in the hardware acceleration plane 106.

Architecture 102 can use any of a variety of different protocols to facilitate communication between acceleration components over network infrastructure 120 and can use any of a variety of different protocols to facilitate communication between host components over network infrastructure 120. For example, architecture 102 can uses Ethernet protocol to transmit Internet Protocol (IP) packets over network infrastructure 120. In one implementation, each local host component in a server is given a single physical IP address. The local acceleration component in the same server may adopt the same IP address. The server can determine whether an incoming packet is destined for the local host component or destined for the local acceleration component in different ways. For example, packets that are destined for the local acceleration component can be formulated as UDP packets having a specific port; host-defined packets, on the other hand, may not be formulated in this way. In another example, packets belonging to the acceleration plane 106 can be distinguished from packets belonging to the software plane 104 based on the value of a status flag in each of the packets.

As such, architecture 102 can be viewed as two logical networks (software plane 104 and hardware acceleration plane 106) that share the same physical network communication links. Packets associated with the two logical networks may be distinguished from each other by their respective traffic classes.

In another aspect, each host component in the architecture 102 is coupled to at least one acceleration component in hardware acceleration plane 104 through a local link. For example, a host component and acceleration component can be arranged together and maintained as single serviceable unit (e.g., a server) within architecture 102. In this arrangement, the server can be referred to as the "local" host component to distinguish it from other host components that are associated with other servers. Similarly, acceleration component(s) of a server can be referred to as the "local" acceleration component(s) to distinguish them from other acceleration components that are associated with other servers.

As depicted in architecture 102, host component 108 is coupled to acceleration component 110 through a local link 112 (e.g., a Peripheral Component Interconnect Express (PCIe) link). Thus, host component 108 is a local host component form the perspective of acceleration component 110 and acceleration component 110 is a local acceleration component from the perspective of host component 108. The local linking of host component 108 and acceleration component 110 can form part of a server. More generally, host components in software plane 104 can be locally coupled to acceleration components in hardware acceleration plane 106 through many individual links collectively represented as a local$_H$-to-local$_S$ coupling 114.

Thus, a host component can interact directly with any locally linked acceleration components. As such, a host component can initiate communication to a locally linked acceleration component to cause further communication among multiple acceleration components. For example, a host component can issue a request for a service (or portion thereof) where functionality for the service (or portion thereof) is composed across a group of one or more acceleration components in hardware acceleration plane 106.

Thus, a host component can also interact indirectly with other acceleration components in hardware acceleration plane 106 to which the host component is not locally linked. For example, host component 108 can indirectly communicate with acceleration component 116 via acceleration component 110. More specifically, acceleration component 110 communicates with acceleration component 116 via a link 118 (e.g., network infrastructure 120).

Acceleration components in hardware acceleration plane 106 can be used to accelerate larger-scale services robustly in a data center. Substantial portions of complex datacenter services can be mapped to acceleration components (e.g., FPGAs) by using low latency interconnects for computations spanning multiple acceleration components. Acceleration components can also be reconfigured as appropriate to provide different service functionality at different times.

Figure 2:
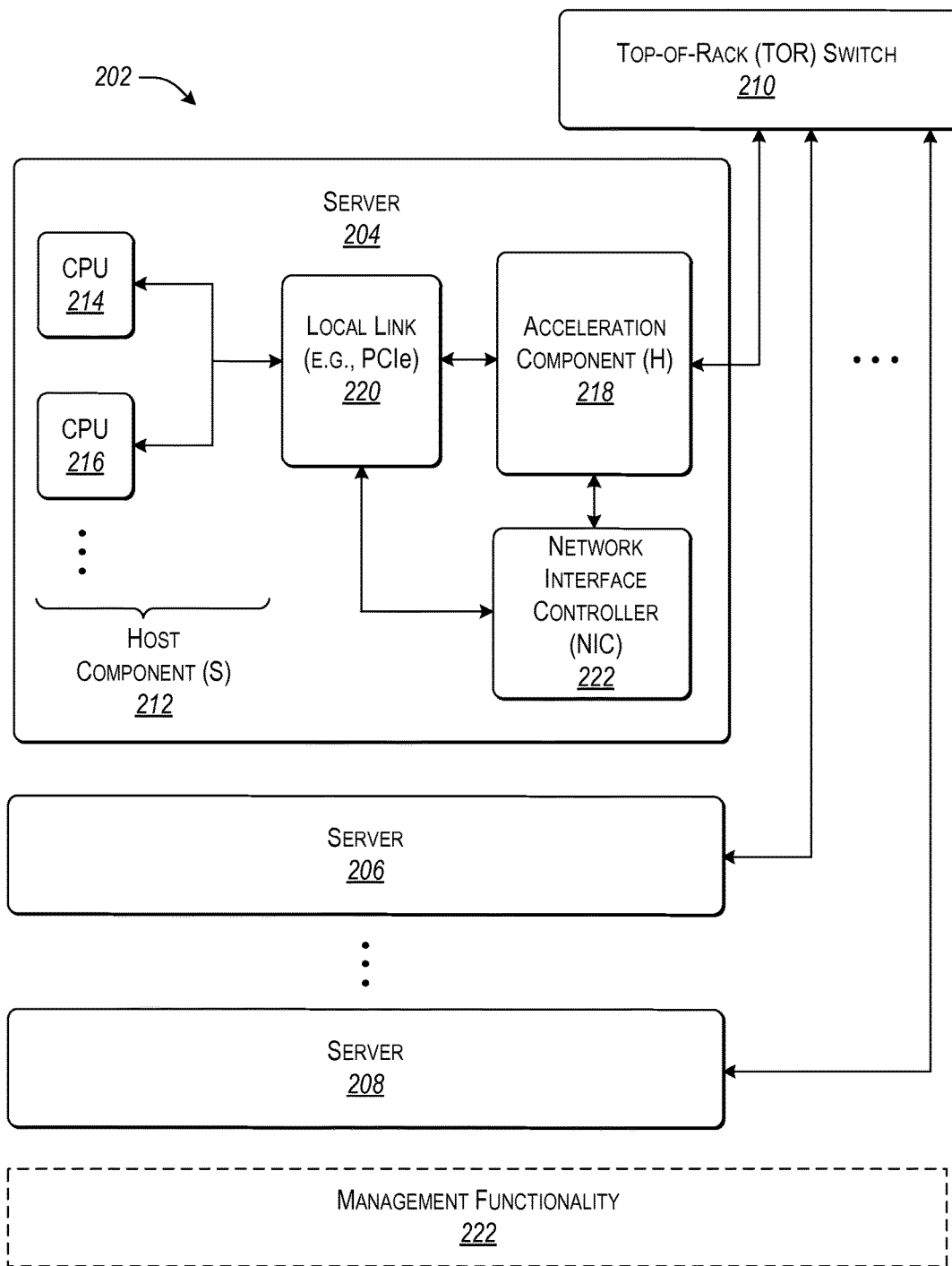
FIG. 2 illustrates an example architecture, including servers, that can be used in a data center

FIG. 2 illustrates an example architecture 202 that can be used in a data center. Servers 204, 206, and 208 can be included in a rack in the data center. Each of servers 204, 206, and 208 can be coupled to top-of-rack (TOR) switch 210. Other racks, although not shown, may have a similar configuration. Server 204 further includes host component 212 including CPUs 214, 216, etc. Host component 212 along with host components from servers 206 and 208 can be included in software plane 104. Server 204 also includes acceleration component 218. Acceleration component 218 along with acceleration components from servers 206 and 208 can be included in hardware acceleration plane 106.

Acceleration component 218 is directly coupled to host component 212 via local link 220 (e.g., a PCIe link). Thus, host component 212 can view acceleration component 218 as a local acceleration component and acceleration component 218 can view host component 212 as a local host component. Acceleration component 218 and host component 212 are also indirectly coupled by way of network interface controller 222 (e.g., used to communicate across network infrastructure 120). Server 204 can load images representing service functionality onto acceleration component 218.

Acceleration component 218 is also coupled to TOR switch 210. Hence, in architecture 202, acceleration component 218 represents the path through which host component 212 interacts with other components in the data center (including other host components and other acceleration components). Architecture 202 allows acceleration component 218 to perform processing on packets that are received from (and/or sent to) TOR switch 210 (e.g., by performing encryption, compression, etc.), without burdening the CPU-based operations performed by host component 212.

Management functionality 232 serves to manage the operations of architecture 202. Management functionality 232 can be physically implemented using different control architectures. For example, in one control architecture, the management functionality 232 may include plural local management components that are coupled to one or more global management components.

Figure 3:
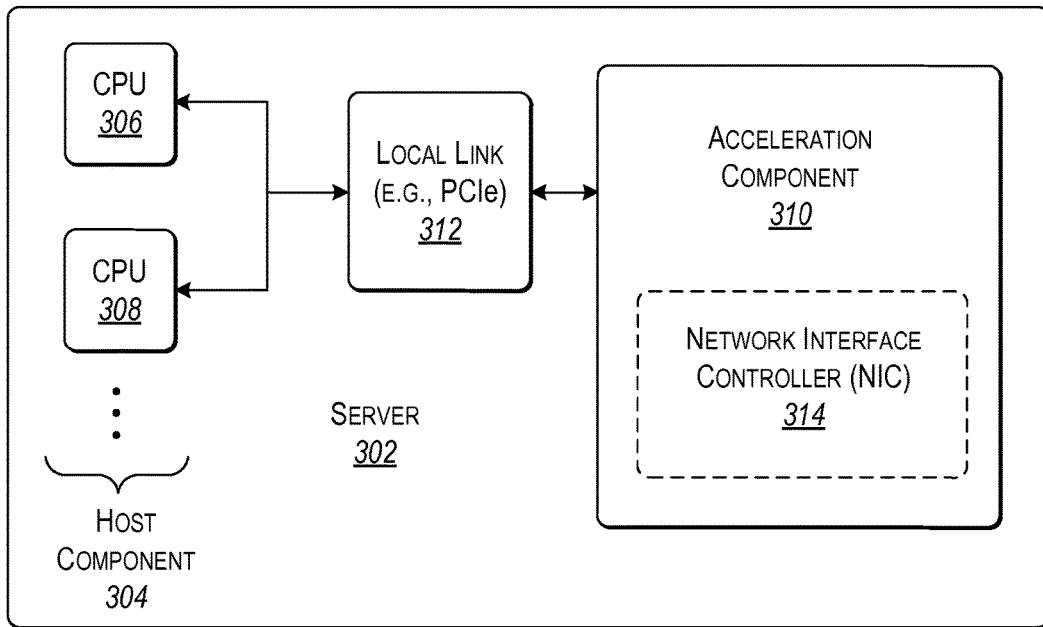
FIG. 3 illustrates an example server.

FIG. 3 illustrates an example server 302. Server 302 includes host component 304 including CPUs 306, 308, etc., acceleration component 310, and local link 312. Acceleration component 310 is directly coupled to host component 304 via local link 312 (e.g., a PCIe link). Thus, host component 304 can view acceleration component 310 as a local acceleration component and acceleration component 310 can view host component 304 as a local host component. Host component 304 and acceleration component 310 can be included in software plane 104 and hardware acceleration plane 106 respectively. Server 302 implements network interface controller (NIC) 314 as an internal component of acceleration component 310. Server 302 can load images representing service functionality onto acceleration component 310.

Figure 4:
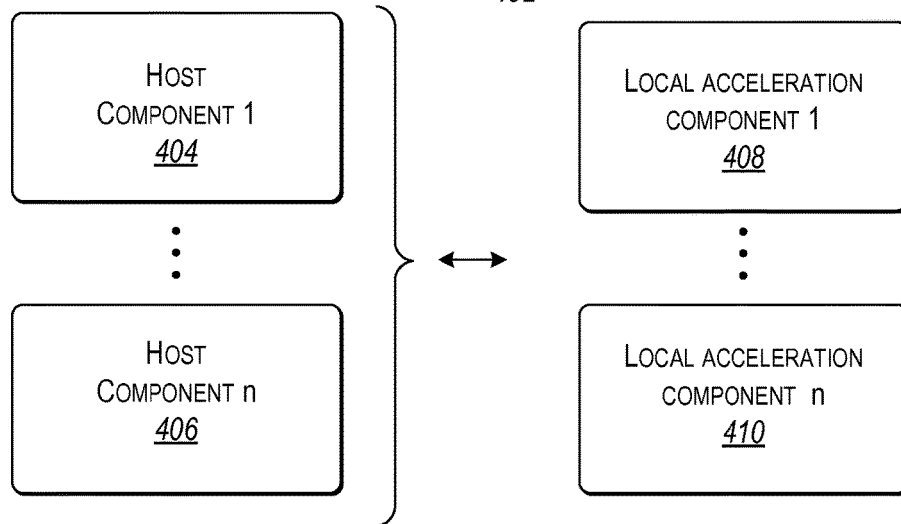
FIG. 4 illustrates an example server.

FIG. 4 illustrates an example server 402. Server 402 includes host components 404 through 406 including any number n of host components. Host components 404 through 406 can be included in software plane 104. Server 402 includes acceleration components 408 through 410 including any number m of acceleration components. Acceleration components 408 through 410 can be included in hardware acceleration plane 106. Server 402 can also include a network interface controller (not shown).

Server 402 can include a single host component locally linked to two acceleration components. The two acceleration components can perform different respective tasks. For example, one acceleration component can be used to process outgoing traffic to its local TOR switch, while the other acceleration component can be used to process incoming traffic from the TOR switch. In addition, server 402 can load images representing service functionality onto any of the acceleration components 408 through 410.

In general, a service (e.g., document ranking, encryption, compression, computer vision, speech translation, etc.) can be implemented at one or more host components, at one or more acceleration components, or a combination of one or more host components and one or more acceleration components depending on what components are better suited to provide different portions of the service.

Figure 5:
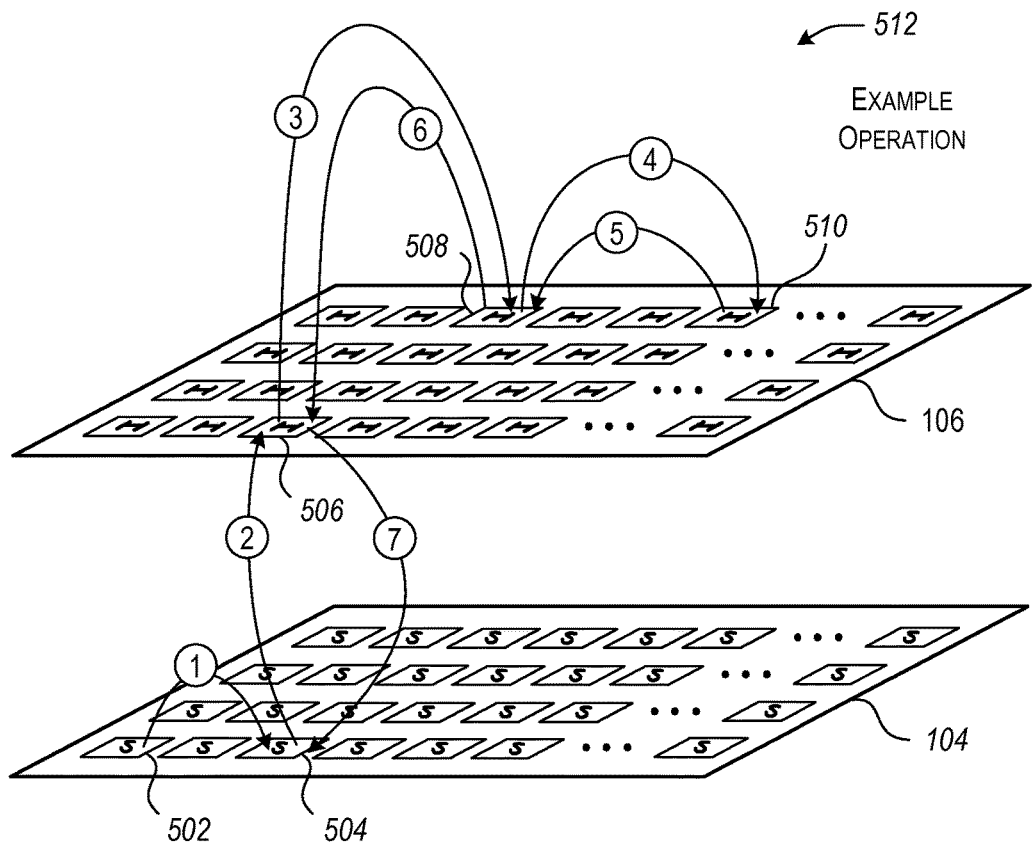
FIG. 5 illustrates an example service implemented using components of a software plane and components of a hardware acceleration plane.

FIG. 5 illustrates an example service 512 implemented using components of software plane 104 and components of hardware acceleration plane 106. In operation (1), host component 502 communicates with host component 504 in the course of performing a computational task. In operation (2) host component 504 then requests the use of service 512 that is implemented in the hardware acceleration plane 106 (although host component 504 may not be "aware" of where service 512 is implemented) by communicating with acceleration component 506 over a local link.

The requested service 512 is a composed service spread out over a plurality of acceleration components, each of which performs a specified portion of the service. Although acceleration component 506 was contacted to request use of the service 512, acceleration component 506 may not be the head of the composed service (or even be part of the multi-component service). Instead, acceleration component 508 may be the head component for the composed service.

As such, in operation (3), host component 504 indirectly communicates with acceleration component 508 via acceleration component 506. Acceleration component 508 then performs its portion of the composed service to generate an intermediate output result. In operation (4), acceleration component 508 then invokes acceleration component 510, which performs another respective portion of the composed service, to generate a final result. In operations (5), (6), and (7), the hardware acceleration plane 106 successively forwards the final result back to the requesting host component 504, through the same chain of components set forth above but in the opposite direction.

Operations in hardware acceleration plane 106 are performed in an independent manner of operations performed in the software plane 104. In other words, the host components in the software plane 104 do not manage the operations in the hardware acceleration plane 106. However, the host components may invoke the operations in the hardware acceleration plane 106 by issuing requests for services that are hosted by the hardware acceleration plane 106.

The hardware acceleration plane 106 operates in a manner that is transparent to a requesting host component. For example, host component 504 may be "unaware" of how its request is being processed in hardware acceleration plane 106, including the fact that the service corresponds to a composed service.

Communication in software plane 104 (e.g., corresponding to operation (1)) can take place using the same common network infrastructure 120 as communication in the hardware acceleration plane 106 (e.g., correspond to operations (3)-(6)). Operations (2) and (7) may take place over a local link, corresponding to the $local_H$-to-$local_S$ coupling 114 shown in FIG. 1.

Figure 6:
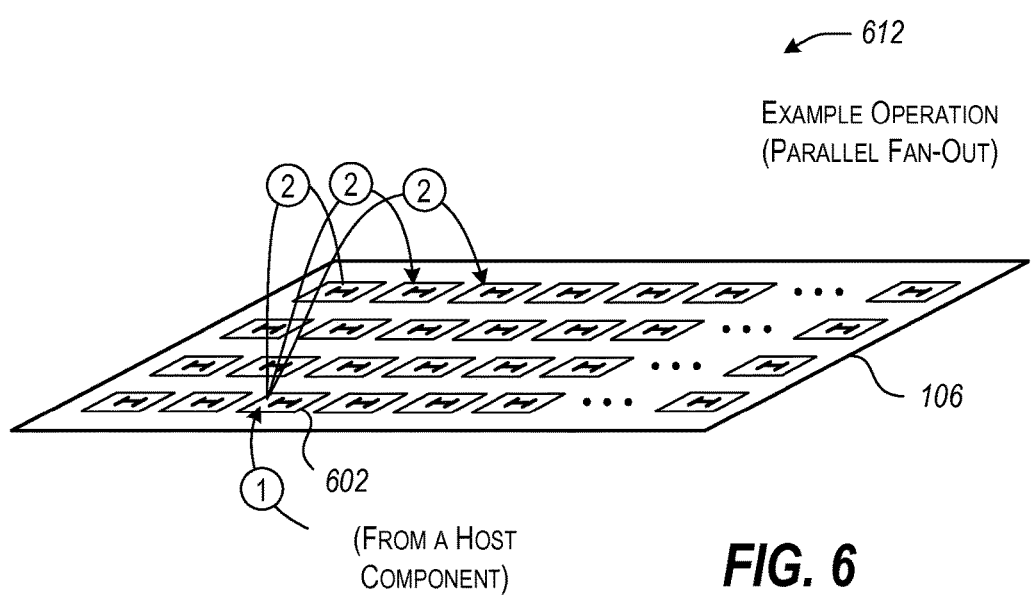
FIG. 6 illustrates an example service implemented using components of a software plane and components of a hardware acceleration plane.

FIG. 6 illustrates an example service 612 implemented using components of a software plane and components of hardware acceleration plane 106 Service 612 uses a different flow structure than service 512. More specifically, in operation (1), a host component (not shown) sends a request to its local acceleration component 602. In this example, local acceleration component 602 is also the head component of service 612. In operation (2), local acceleration component 602 may then forward one or more messages to a plurality of respective acceleration components. Each acceleration component that receives a message may perform a portion of a composed service in parallel with the other acceleration components. (FIG. 6 may represent only a portion of service 612, other portions of service 612 can be implemented at other hardware accelerators).

In general, an acceleration component can include any of variety of components some of which can be more or less common across different application images. Some components, such as, for example, a role, are distinct between application images. Other components, such as, for example, routers, transport components, switches, diagnostic recorders, etc., can be relatively common between some number of application images. These other relatively common components can be viewed as being included in an intermediate layer of abstraction or "soft shell". Further components, such as, for example, bridges, bypass controls, Network Interface Cards, Top of Rack Interfaces, buffers, memory controllers, PCIe controllers, Inter-FPGA network controllers, configuration memories and interfaces, host interfaces, debugging and back-channel interfaces (e.g., Joint Test Action Group (JTAG) interfaces, Inter-Integrated Circuit (I2C) interfaces, etc.), sensors, etc. can be very common between a higher number of (and essentially all) application images. These further very common components can be viewed as included in a greater layer of abstraction (e.g., than the other relatively common components) or "shell".

When an FPGA is reconfigured with new functionality, it is likely (although not guaranteed) that a role (i.e., the application-specific logic) at the FGPA is changed. However, it is unlikely that existing functionality in the soft shell is changed and it is extremely unlikely that existing functionality in the soft shell is changed. Thus, components in the soft shell and to greater extent components in the shell provide a common interface for a role. As such, the shell allows code for a role to be ported relatively easy across different acceleration components.

Figure 7:
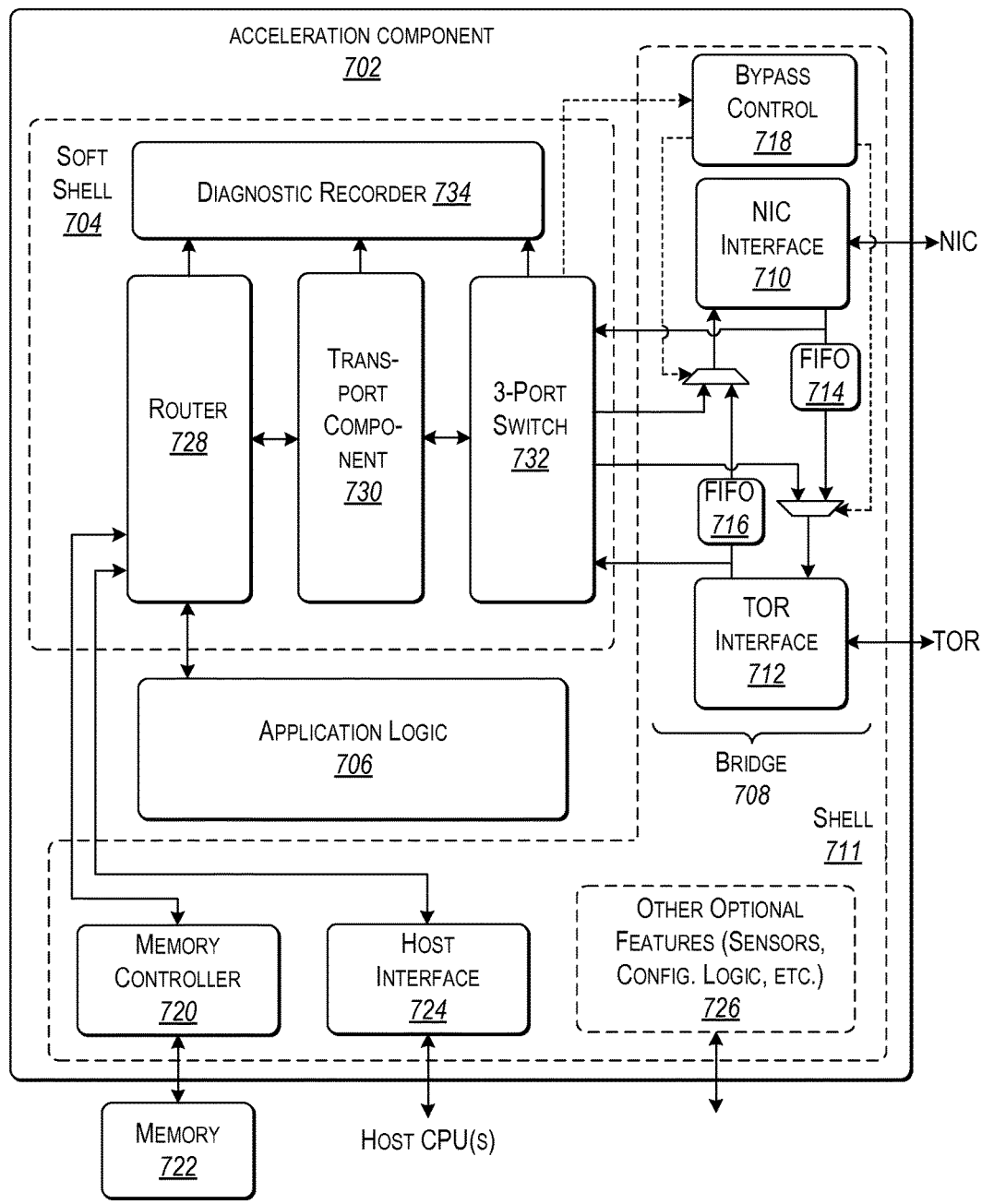
FIG. 7 illustrates an example architecture of an acceleration component.

Turning to FIG. 7, FIG. 7 illustrates an example architecture of an acceleration component 702. Acceleration component 702 can be included in hardware acceleration plane 106. Components included in acceleration component 702 can be implemented on hardware resources (e.g., logic blocks and programmable interconnects) of acceleration component 702.

Acceleration component 702 includes application logic 706, soft shell 704 associated with a first set of resources and shell 711 associated with a second set of resources. The resources associated with shell 711 correspond to lower-level interface-related components that generally remain the same across many different application scenarios. The resources associated with soft shell 704 can remain the same across at least some different application scenarios. Application logic 706 may be further conceptualized as including an application domain (e.g., a "role"). The application domain or role can represent a portion of functionality included in a composed service spread out over a plurality of acceleration components.

The application domain hosts application logic 706 that performs service specific tasks (such as a portion of functionality for ranking documents, encrypting data, compressing data, facilitating computer vision, facilitating speech translation, machine learning, etc.). Resources associated with soft shell 704 are generally less subject to change compared to the application resources, and the resources associated with shell 711 are less subject to change compared to the resources associated with soft shell 704 (although it is possible to change (reconfigure) any component of acceleration component 702).

In operation, application logic 706 interacts with the shell resources and soft shell resources in a manner analogous to the way a software-implemented application interacts with its underlying operating system resources. From an application development standpoint, the use of common shell resources and soft shell resources frees a developer from having to recreate these common components for each service.

Referring first to shell 711, shell resources include bridge 708 for coupling acceleration component 702 to the network interface controller (via a NIC interface 710) and a local top-of-rack switch (via a TOR interface 712). Bridge 708 also includes a data path that allows traffic from the NIC or TOR to flow into acceleration component 702, and traffic from the acceleration component 702 to flow out to the NIC or TOR. Internally, bridge 708 may be composed of various FIFOs (714, 716) which buffer received packets, and various selectors and arbitration logic which route packets to their desired destinations. A bypass control component 718, when activated, can control bridge 708 so that packets are transmitted between the NIC and TOR without further processing by the acceleration component 702.

Memory controller 720 governs interaction between the acceleration component 702 and local memory 722 (such as DRAM memory). The memory controller 720 may perform error correction as part of its services.

Host interface 724 provides functionality that enables acceleration component 702 to interact with a local host component (not shown). In one implementation, the host interface 724 may use Peripheral Component Interconnect Express (PCIe), in conjunction with direct memory access (DMA), to exchange information with the local host component. The outer shell may also include various other features 726, such as clock signal generators, status LEDs, error correction functionality, and so on.

Turning to soft shell 704, router 728 is for routing messages between various internal components of the acceleration component 702, and between the acceleration component and external entities (e.g., via a transport component 730). Each such endpoint is associated with a respective port. For example, router 728 is coupled to memory controller 720, host interface 724, application logic 706, and transport component 730.

Transport component 730 formulates packets for transmission to remote entities (such as other acceleration components), and receives packets from the remote entities (such as other acceleration components). A 3-port switch 732, when activated, takes over the function of the bridge 708 by routing packets between the NIC and TOR, and between the NIC or TOR and a local port associated with the acceleration component 702.

Diagnostic recorder 734 can store information regarding operations performed by the router 728, transport component 730, and 3-port switch 732 in a circular buffer. For example, the information may include data about a packet's origin and destination IP addresses, host-specific data, timestamps, etc. A technician may study a log of the information in an attempt to diagnose causes of failure or sub-optimal performance in the acceleration component 702.

A plurality of acceleration components similar to acceleration component 702 can be included in hardware acceleration plane 106.

Acceleration components can use different network topologies (instead of using common network infrastructure 120 for communication) to communicate with one another. In one aspect, acceleration components are connected directly to one another, such as, for example, in a two dimensional torus.

Figure 8:
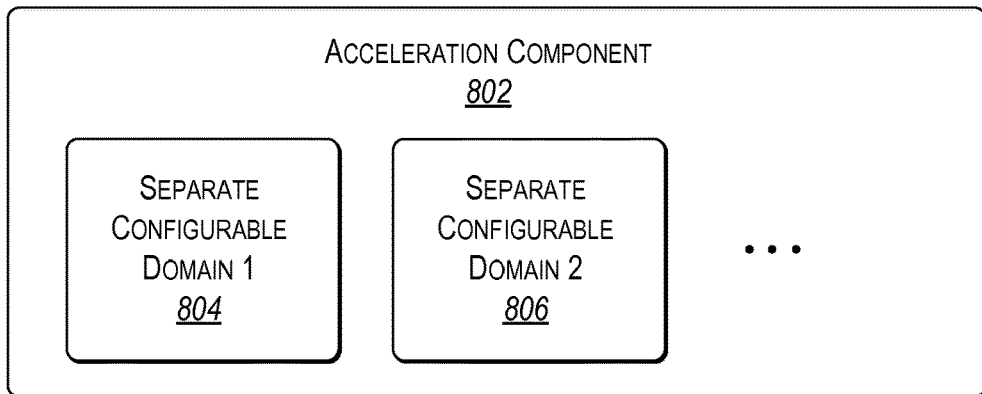
FIG. 8 illustrates an acceleration component including separate configurable domains.

FIG. 8 illustrates an acceleration component 802 including separate configurable domains 804, 806, etc. A configuration component (not shown) can configure each configurable domain without affecting other configurable domains. Hence, the configuration component can configure one or more configurable domains while the other configurable domains are executing operations based on their respective configurations, which are not disturbed.

Figure 9:
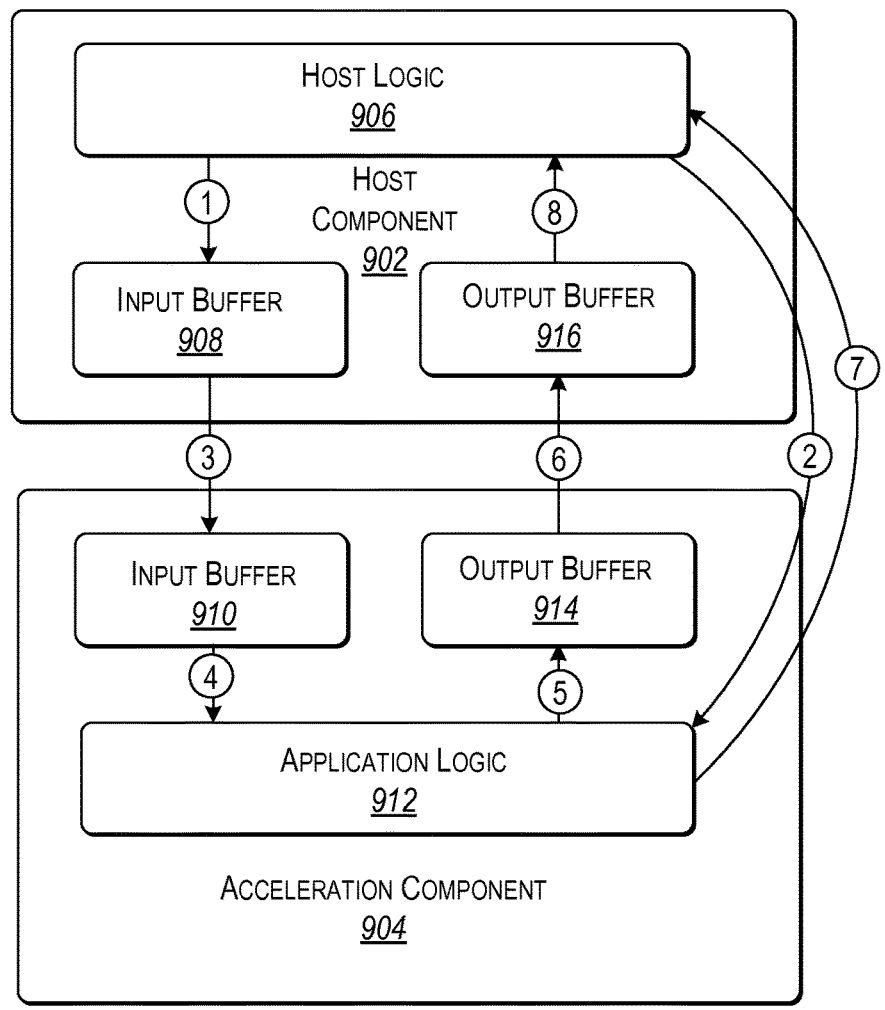
FIG. 9 illustrates functionality for performing data transfer between a local host component and an associated local hardware acceleration component.

FIG. 9 illustrates functionality for performing data transfer between a host component 902 and an associated (e.g., locally linked) acceleration component 904. Data can be transferred via a host interface (e.g., host interface 724), for example, using PCIe in conjunction with DMA memory transfer). In operation (1), host logic 906 places data to be processed into kernel-pinned input buffer 908 in main memory associated with the host logic 906. In operation (2), the host logic 906 instructs the acceleration component 904 to retrieve the data and begin processing it. The host logic's thread is then either put to sleep until it receives a notification event from the acceleration component 904, or it continues processing other data asynchronously. In operation (3), the acceleration component 904 transfers the data from the host logic's memory and places it in an acceleration component input buffer 910.

In operations (4) and (5), the application logic 912 retrieves the data from the input buffer 910, processes it to generate an output result, and places the output result in an output buffer 914. In operation (6), the acceleration component 904 copies the contents of the output buffer 914 into output buffer 916 (in the host logic's memory). In operation (7), acceleration component 904 notifies the host logic 906 that the data is ready for it to retrieve. In operation (8), the host logic thread wakes up and consumes the data in the output buffer 916. Host logic 906 may then discard the contents of the output buffer 916, which allows the acceleration component 904 to reuse it in the next loading operation.

Figure 10:
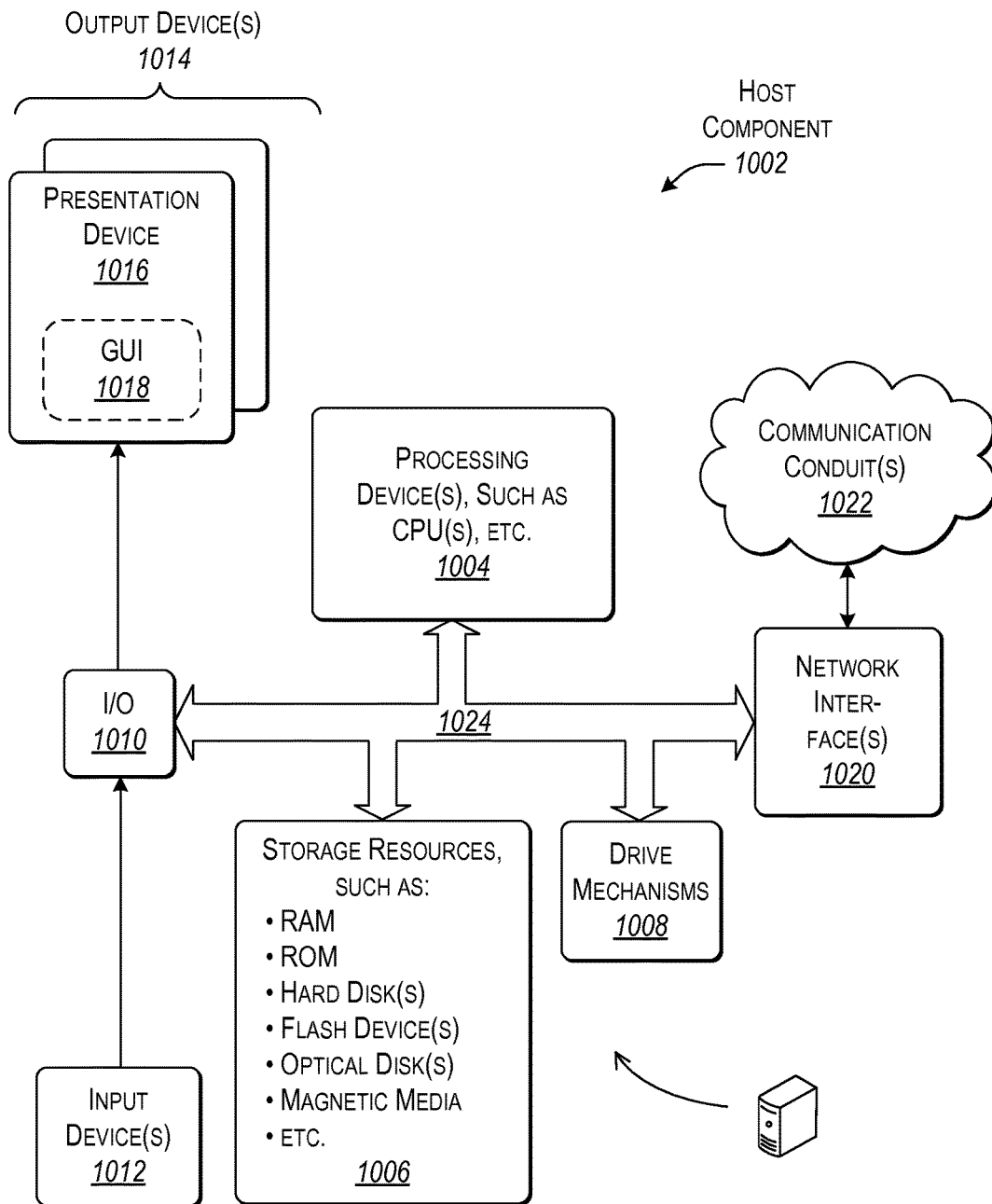
FIG. 10 illustrates an example architecture of a host component.

FIG. 10 illustrates an example architecture of a host component 1002. Host component 1002 can include one or more processing devices 1004, such as one or more central processing units (CPUs). Host component 1002 can also include any storage resources 1006 for storing any kind of information, such as code, settings, data, etc. Without limitation, for instance, storage resources 1006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of host component 1002. In one case, host component 1002 may perform any of the operations associated with local tenant functionality when processing devices 1004 carry out associated instructions stored in any storage resource or combination of storage resources. Host component 1002 also includes one or more drive mechanisms 1008 for interacting with any storage resource, such as a hard disk drive mechanism, an optical disk drive mechanism, and so on.

Host component 1002 also includes an input/output module 1010 for receiving various inputs (via input devices 1012), and for providing various outputs (via output devices 1014). One particular output mechanism may include a presentation device 1016 and an associated graphical user interface (GUI) 1018. Host component 1002 can also include one or more network interfaces 1020 for exchanging data with other devices via one or more communication conduits 1022. One or more communication buses 1024 communicatively couple the above-described components together.

Communication conduit(s) 1022 can be implemented in any manner, e.g., by a local area network, a wide area network (e.g., the Internet), point-to-point connections, etc., or any combination thereof. Communication conduit(s) 1022 can include any combination of hardwired links, wireless links, routers, gateway functionality, name servers, etc., governed by any protocol or combination of protocols.

A plurality of host components similar to host component 1002 can be included in software plane 104.

Figure 11:
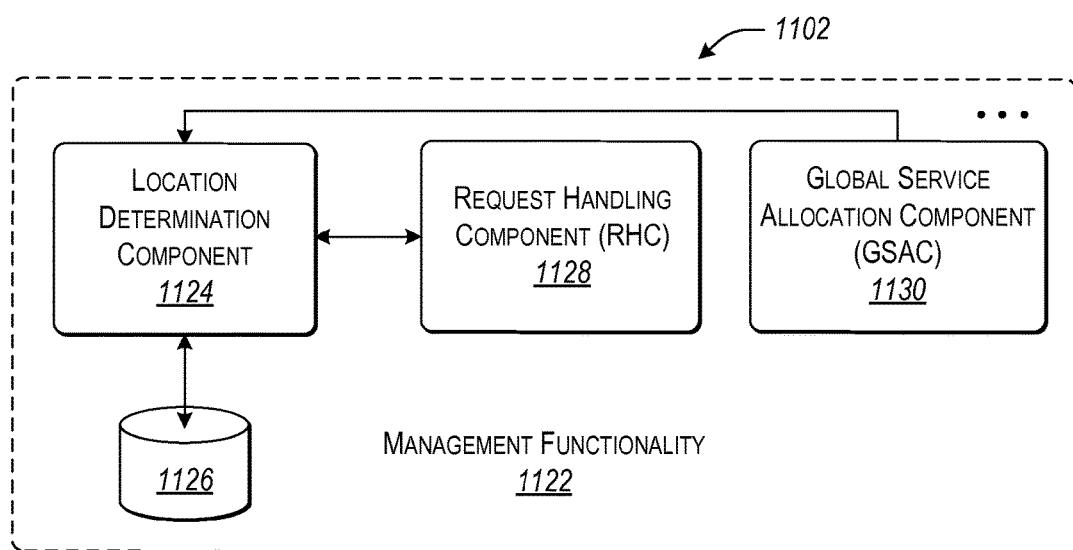
FIG. 11 illustrates an example architecture of management functionality for managing services in a data center.

FIG. 11 illustrates an example architecture 1102 of management functionality 1122 for managing services in a data center. Architecture 1102 can be included in architecture 102. As such, management functionality 1122 as well as other associated components can be implemented on hardware resources of a host component (e.g., in software plane 104) and/or implemented on hardware resources of an acceleration component (e.g., in hardware acceleration plane 106). Host component hardware resources can include any of the hardware resources associated with host component 1002. Acceleration component hardware resources can include any of the hardware resources associated with acceleration component 702.

Management functionality 1122 can include a number of sub-components that perform different respective functions (which can be physically implemented in different ways). A local determination component 1124, for example, can identify the current locations of services within architecture 102, based on information stored in a data store 1126. In operation, location determination component 1124 may receive a request for a service. In response, location determination component 1124 returns an address associated with the service, if that address is present in data store 1126. The address may identify a particular acceleration component in hardware acceleration plane 106 that hosts (or is the head of) the requested service.

Request handling component (RHC) 1128 processes requests for services made by instances of tenant functionality. For example, an instance of tenant functionality may correspond to a software program running on a particular local host component. That software program may request a service in the course of its execution. The RHC 1128 handles the request by determining an appropriate component in architecture 102 to provide the service. Possible components for consideration include: a local acceleration component (associated with the local host component from which the request originated); a remote acceleration component; and/ or the local host component itself (whereupon the local host component implements the service in software). RHC 1128 makes its determinations based on one or more request handling considerations, such as whether the requested service pertains to a line-rate service. Further, the RHC 1128 may interact with the location determination component 1124 in performing its functions.

A global service allocation component (GSAC) 1130 can operate in a background and global mode, allocating services to acceleration components based on global conditions in architecture 102 (rather than handling individual requests from instances of tenant functionality, as does RHC 1128). For example, GSAC 1130 may invoke its allocation function in response to a change in demand that affects one or more services. GSAC 1130 makes its determinations based on one or more allocation considerations, such as the historical demand associated with the services, etc. Further, the GSAC 1130 may interact with the location determination component 1124 in performing its functions. A sub-component of GSAC 1130 can also manage multi-component and/or composed services. A multi-component service is a service that is composed of plural parts. Plural respective acceleration components perform the respective parts.

Figure 12:
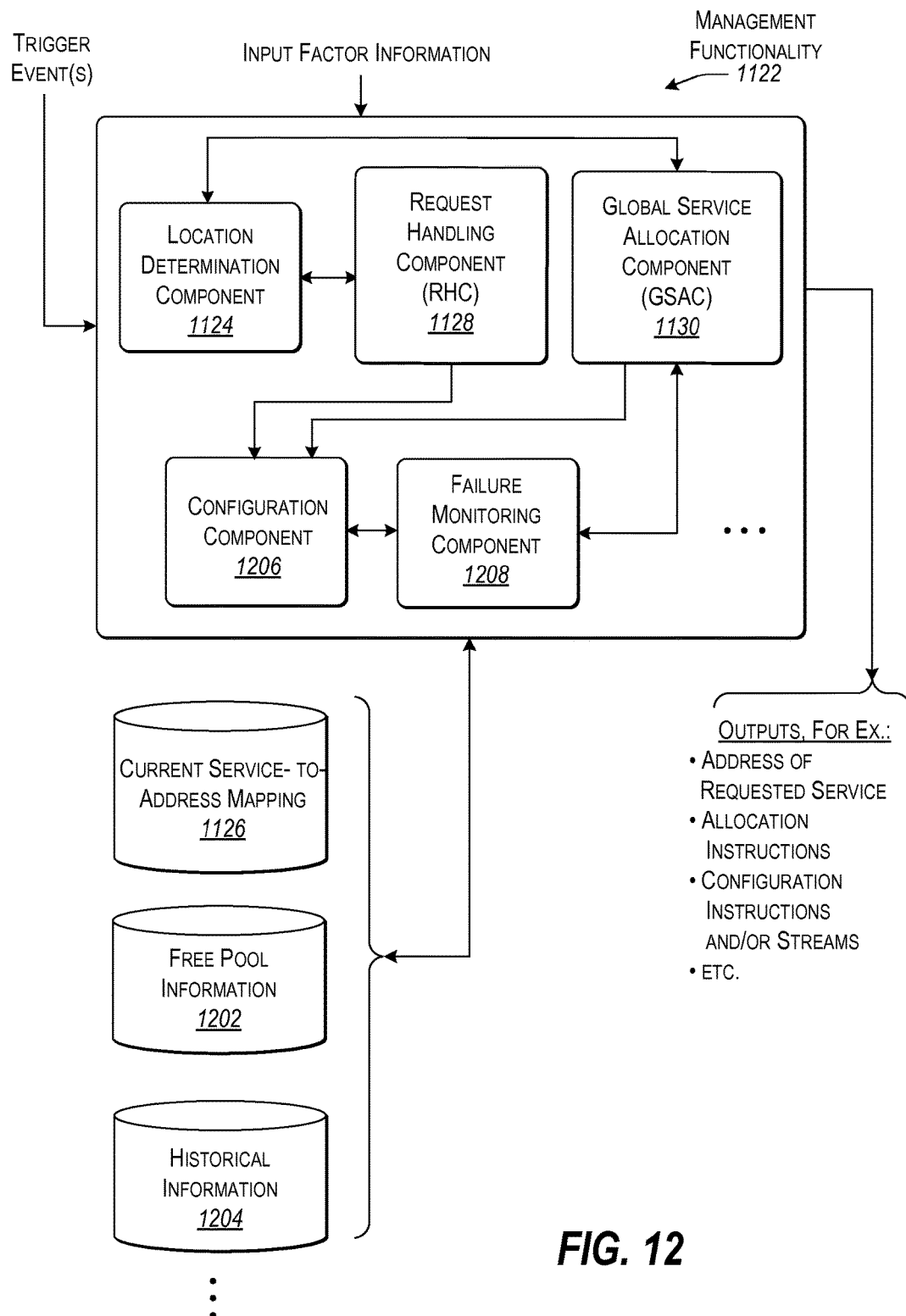
FIG. 12 illustrates an example architecture with additional components of the management functionality of FIG. 11.

FIG. 12 illustrates an example architecture with additional components of management functionality 1122. As described, location determination component 1124 identifies the current location of services within architecture 102, based on information stored in the data store 1126. In operation, the location determination component 1124 receives a request for a service. In response, it returns the address of the service, if present within the data store 1126. The address may identify a particular acceleration component that implements the service.

Request handling component (RHC) 1128 handles requests for services by tenant functionality that resides on the host components. In response to each request by a local host component, RHC 1128 determines an appropriate component to implement the service. For example, RHC 1128 may choose from among: a local acceleration component (associated with the local host component that made the request), a remote acceleration component, or the local host component itself (whereupon the local host component will implement the service in software), or some combination thereof. RHC 1128 performs its determinations based on one or more request handling considerations.

General allocation component (GSAC) 1130, on the other hand, operates by globally allocating services to acceleration components within architecture 102 to meet overall anticipated demand in the data processing system and/or to satisfy other objectives (rather than individual requests by host components). In performing its functions, the GSAC component 1130 may draw on a data store 1202 that provides free pool information. The free pool information identifies acceleration components that have free capacity to implement one or more services. The GSAC 1130 can also receive input information that has a bearing on its allocation decisions. One such piece of input information pertains to historical demand information associated with a service, e.g., as maintained in a data store 1204.

GSAC 1130 and RHC 1128 may use, in part, common logic in reaching their allocation decisions, and that common logic may, in part, taken into account similar allocation considerations. Further, both RHC 1128 and GSAC 1130 interact with the location determination component 124 in the course of performing their respective operations. Otherwise, as described, the GSAC 1130 frames its decisions in a global context, whereas the RHC 1128 is an on-demand component that is primarily focused on satisfying specific requests.

Configuration component 1206 configures acceleration components, for example, by sending a configuration stream to the acceleration components. A configuration stream specifies the logic (e.g., an image) to be "programmed" into a recipient acceleration component. The configuration component 1206 may use different strategies to configure an acceleration component.

The failure monitoring component 1208 determines whether a previously configured acceleration component has failed. Various components of the management functionality 1122 may respond to failure notification by substituting a spare acceleration component for a failed acceleration component, reconfiguring an acceleration component, partial reconfiguring acceleration component, reloading data in an acceleration component, etc.

As described, functionality for a service or portion thereof can be provided by linking roles from a group of interoperating acceleration components. The linked roles can be composed in a directed graph in any variety of different ways, including a directed acyclic graph, a directed cyclic graph, etc., to provide service functionality and/or acceleration. For example, in some aspects, linked roles are composed in a pipeline or ring.

Figure 13A:
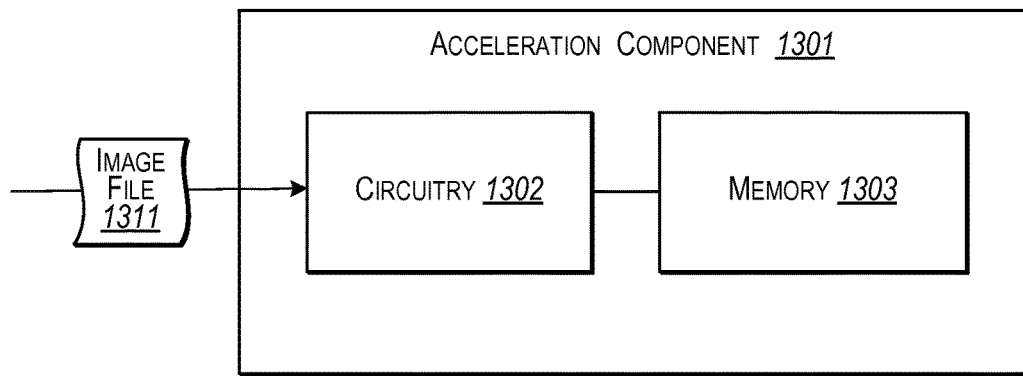
FIGS. 13A-13E illustrate an example architecture that facilitates changing between roles at an acceleration component.

FIGS. 13A-13E illustrate an example architecture that facilitates changing between roles at an acceleration component. Turning to FIG. 13A, acceleration component 1301 includes programmable circuitry 1302 and memory 1303 (e.g., Dynamic Random Access Memory ("DRAM"), Static Random Access Memory ("DRAM"), flash memory, etc.). Programmable circuitry 1302 can include an array of programmable logic blocks and a hierarchy of reconfigurable interconnects that allow logic blocks to be connected together in different configurations to provide different functionality (i.e., different roles)). Image file 1311 can be loaded at acceleration component 1301 to configure acceleration component 1301.

Figure 13B:
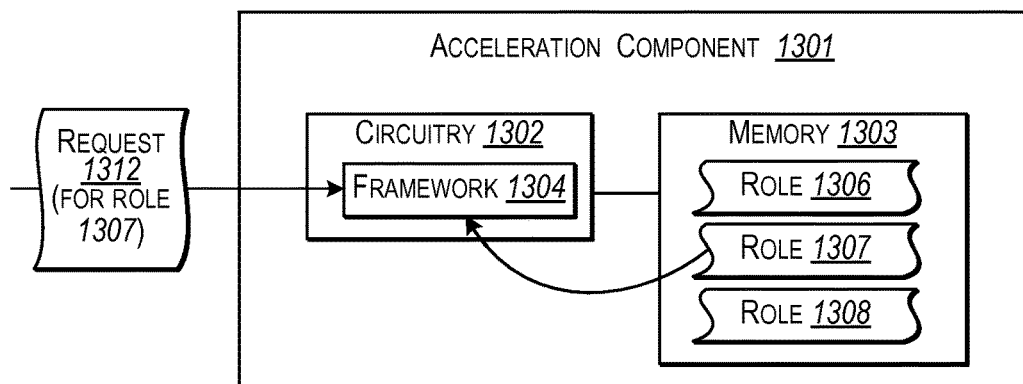

Turning to FIG. 13B, loading image file 1311 configures framework 1304 for execution in circuitry 1302 and stores data for implementing roles 1306, 1307, and 1308 in memory 1303. Framework 1304 provides a (e.g., somewhat generalized) execution environment capable of executing any of roles 1306, 1307, 1308. That is, circuitry 1302 is essential programmed to handle execution of any of roles 1306, 1307, 1308.

Subsequently, acceleration component 1301 can receive request 1312 requesting that acceleration component 1301 provide role 1307. In response, data for role 1307 can be loaded into framework 1304.

Figure 13C:
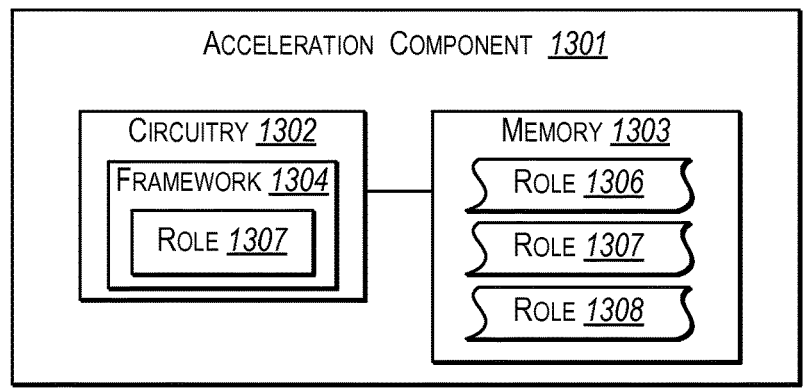

Turning to FIG. 13C, framework 1304 can process the data to provide role 1307 to other components.

Figure 13D:
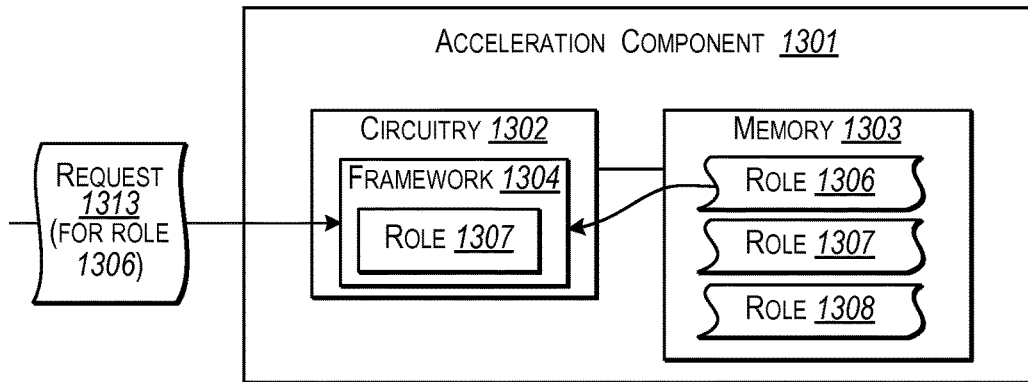

Turning to FIG. 13D, acceleration component 1301 can subsequently receive request 1313 requesting that acceleration component 1301 provide role 1306. In response, data for role 1306 can be loaded into framework 1304. Data for role 1307 can be removed from framework 1304.

Figure 13E:
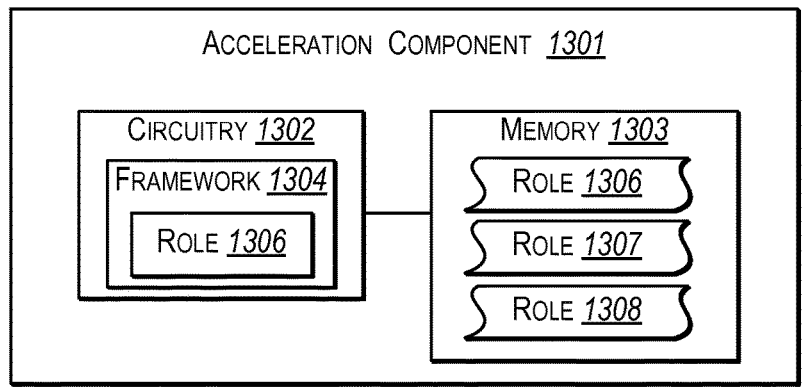

Turning to FIG. 13E, framework 1304 can process the data to provide role 1306 to other components. As such, acceleration component 1301 can change between different functionality (i.e., different roles) without having to load a different image file.

Accordingly, frameworks can provide a plurality of fully configurable roles at an acceleration component. For example, data can be reloaded to switch between roles provided by an already-configured framework. Using frameworks for reconfiguration saves significant reconfiguration time relative to loading a new image file. Reconfiguration times for full circuitry (i.e., loading an image file) are on the order of 100s of milliseconds or more. On the other hand, reconfiguration time for model reload (role reload) by a framework is on the order of 100s of microseconds.

Figure 14A:
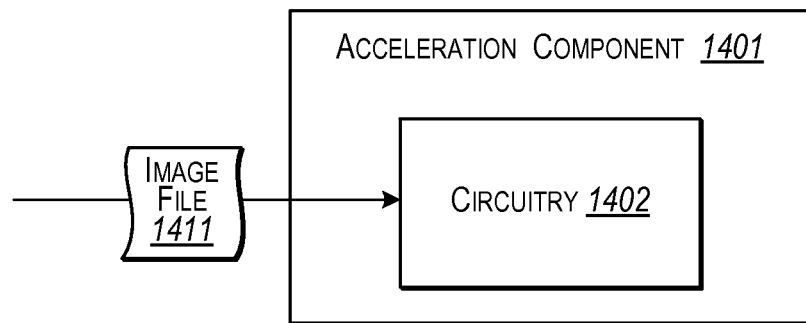
FIGS. 14A-14E illustrate an example architecture that facilitates changing between roles at an acceleration component.

FIGS. 14A-14E illustrate an example architecture that facilitates changing between roles at an acceleration component. Turning to FIG. 14A, acceleration component 1401 includes programmable circuitry 1402 (and can also include memory (e.g., DRAM)). Programmable circuitry 1402 can include an array of programmable logic blocks and a hierarchy of reconfigurable interconnects that allow logic blocks to be connected together in different configurations (to provide different functionality (i.e., different roles)). Image file 1411 can be loaded at acceleration component 1401 to configure circuitry 1402. Loading image file 1411 can cause framework 1403 to be programmed into circuitry 1402 and various different instruction blocks 1404A-1404F to be stored in memory at acceleration component 1401.

Figure 14B:
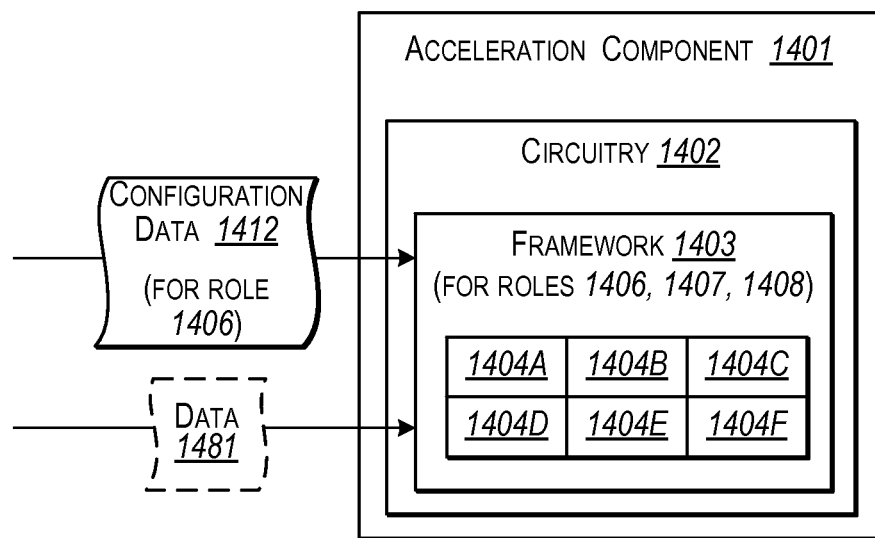

Framework 1403 provides a (e.g., somewhat generalized) execution environment for executing different combinations of instruction blocks 1404A-1404F to provide any of roles 1406, 1407, 1408. That is, circuitry 1402 is essential programmed to handle execution of any of roles 1406, 1407, 1408. Turning to FIG. 14B, acceleration component 1401 can subsequently receive configuration data 1412 (e.g., over PCIe) requesting that acceleration component 1401 provide role 1406.

Figure 14C:
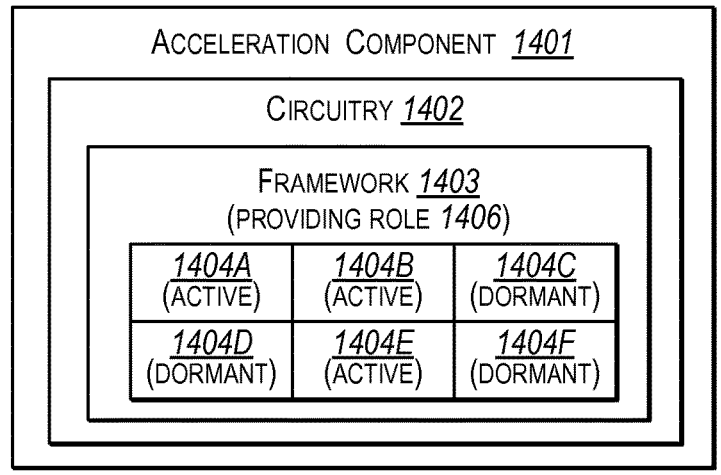

Turning to FIG. 14C, framework 1403 can process configuration data 1412 to activate instruction blocks 1404A, 1404B, and 1404E from memory to provide role 1406 to other components.

Figure 14D:
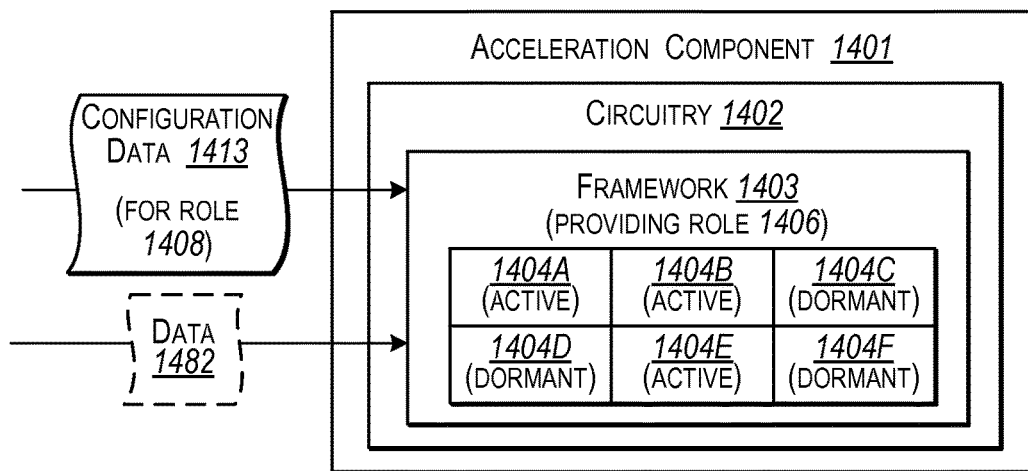

Turning to FIG. 14D, acceleration component 1401 can subsequently receive configuration data 1413 requesting that acceleration component 1401 provide role 1408.

Figure 14E:
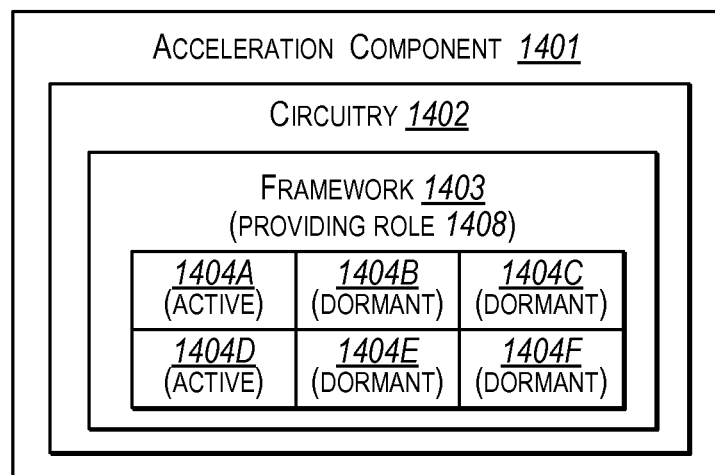

Turning to FIG. 14E, framework 1403 can process configuration data 1412 to activate instruction block 1404D from memory and deactivate instruction blocks 1404B and 1404E from memory to provide role 1408 to other components. As such, acceleration component 1401 can change between different functionality (i.e., different roles) without having to load a different image file into circuitry 1402.

Roles at a group of interoperating acceleration components can be linked together to form a graph that provides service acceleration for accelerating a service, such as, for example, document ranking, encryption, compression, computer vision, speech translation, etc. A graph can provide service acceleration for an entire service or part of a service. For example, a graph can be used to accelerate part of a document ranking service used to provide search engine results. The graph can interoperate with other portions of service functionality composed from other groups of interoperating acceleration components and/or provided by one or more host components. For example, for a document ranking service, acceleration for document feature extraction can be composed from one group of interoperating acceleration components, acceleration for free form expression calculations can be composed from another group of interoperating acceleration components, and acceleration for scoring calculations can be composed from a further group of interoperating acceleration components.

Different roles can be linked together to compose graphs for different types of service acceleration accelerating. Different types of service acceleration include accelerating different services (e.g., computer vision and encryption) and accelerating different versions of similar (or the same) services (e.g., ranking documents in English and ranking documents in French). Different models can be used to change between different types of acceleration across a group of interoperating acceleration components.

As such, a plurality of roles linked together can provide a graph for service acceleration, such as, for example, document ranking, data encryption, data compression, speech translation, and computer vision. Different models may be appropriate for providing service acceleration over different data. For example, for a document ranking service, different models can be used for ranking documents in different languages. Thus, in some aspects, functionality (roles) at a group of interoperating acceleration components is changed together to change the model for a service.

Figure 15A:
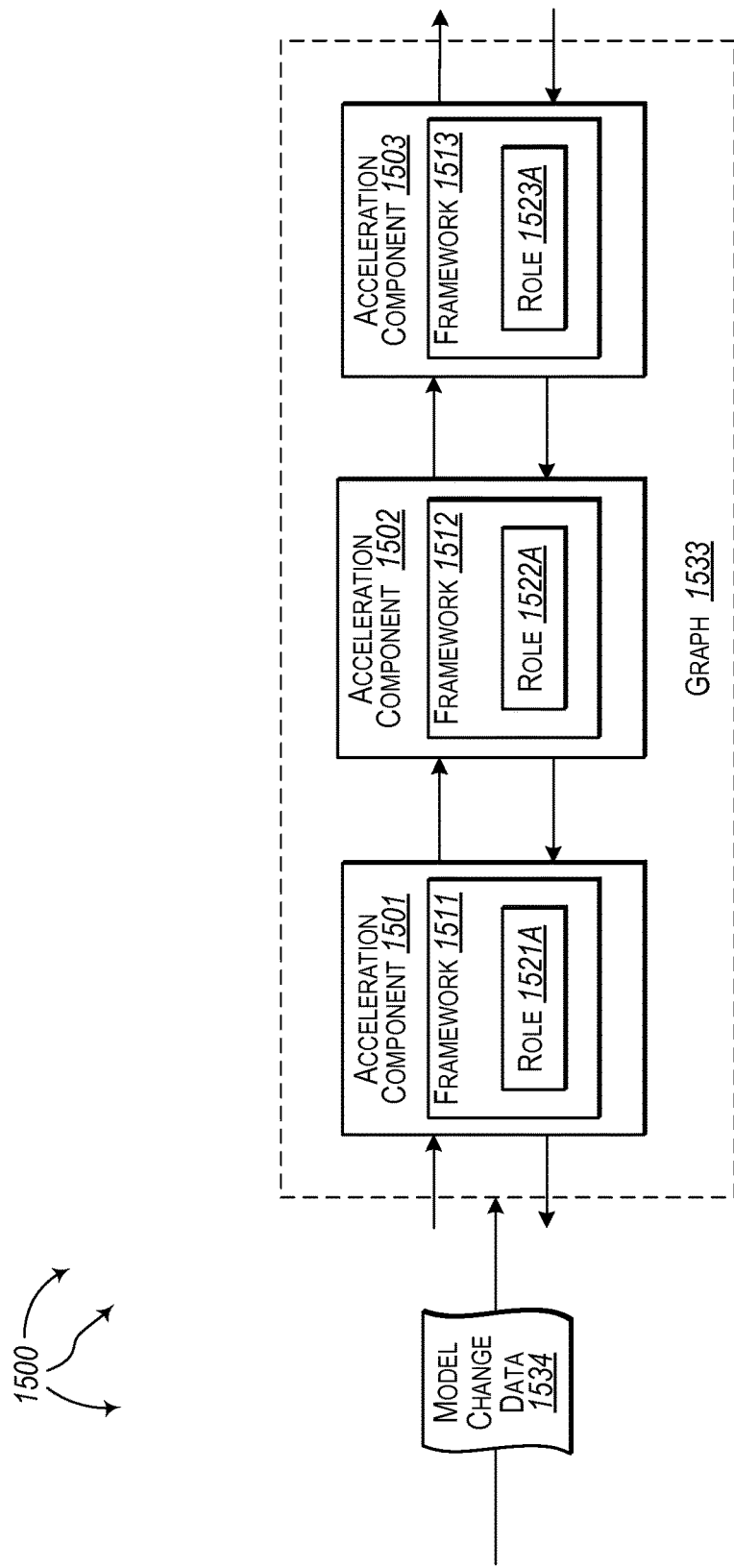
FIGS. 15A and 15B illustrate an example architecture that facilitates changing service acceleration provided by a group of interoperating acceleration components.
Figure 15B:
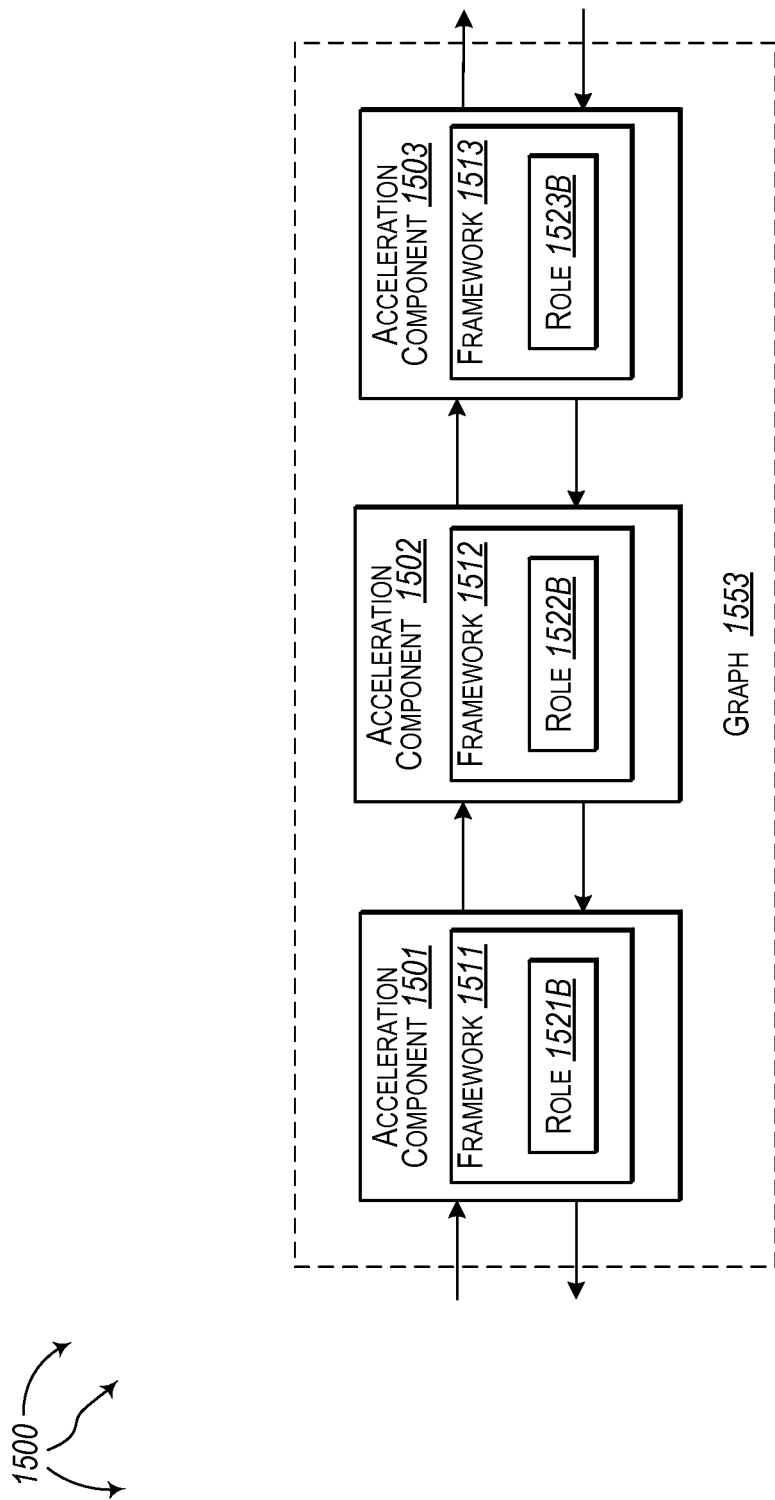

FIGS. 15A and 15B illustrate an example 1500 architecture that facilitates changing service acceleration provided by a group of interoperating acceleration components. Referring initially to FIG. 15A, computer architecture 1500 includes acceleration components 1501-1503. Acceleration components 1501-1503 (e.g., FPGAs) can be connected to (or be part of) a network, such as, for example, a Local Area Network ("LAN"), a Wide Area Network ("WAN"), and even the Internet. Accordingly, acceleration components 1501-1503, as well as any other connected computer systems and their components (e.g., host components, service managers, etc.), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In one aspect, acceleration components 1501-1503 are connected to network infrastructure 120. Acceleration components 1501-1503 can be included in hardware acceleration plane 106. Other components can include host components and/or other acceleration components. The host components and/or other acceleration components can be included in software plane 104 and/or hardware acceleration plane 106 respectively.

Each of acceleration components 1501-1503 can include an array of programmable logic blocks and hierarchy of reconfigurable interconnects that allow logic blocks to be connected together in different configurations to provide different functionality (i.e., different roles). Image files can be received and loaded at acceleration component acceleration components 1501-1503 to configure programmable logic blocks and configure interconnects to provide desired functionality (i.e., roles).

As depicted, acceleration components 1501, 1502, and 1503 are programmed with roles 1521A, 1522A, and 1523A respectively. Roles 1521A, 1522A, and 1523A are linked together to compose graph 1533. Graph 1533 provides service acceleration for a service, such as, for example, document ranking, encryption, compression, computer vision, speech translation, etc. The depicted arrangement of acceleration components 1501, 1502, and 1503 is logical. The physical proximity of acceleration components 1501, 1502, and 1503 relative to one another can vary (e.g., same server, different servers same rack, different racks, etc.).

Some or all of acceleration components 1501, 1502, and 1503 can participate in one-way or two-communication with (logically) neighboring acceleration components and other components (e.g., host components). Thus, input and output from one acceleration component can depend on input and output from another acceleration component and vice versa. For example, input to role 1522A can depend on output from role 1523A and input to role 1521A can depend on output from role 1522A. Similarly, input to role 1522A can depend on output from role 1531A and input to role 1523A can depend on output from role 1522A. The depicted arrows indicate input and output to the roles in architecture 1500.

Graph 1533 can provide service acceleration for an entire service or part of a service. For example, the graph can be used to accelerate part of a document ranking service providing search engine results. Graph 1533 can interoperate with other portions of service functionality composed from other groups of interoperating acceleration components and/or provided by one or more host components. For example, for a document ranking service, acceleration for document feature extraction can be composed from one group of interoperating acceleration components, acceleration for free form expression calculations can be composed from another group of interoperating acceleration components, and acceleration for scoring calculations can be composed from a further group of interoperating acceleration components.

Each of acceleration components 1501, 1502, and 1503 are programmed with corresponding frameworks 1511, 1512, and 1513. Frameworks 1511, 1512, and 1513 can be configured to provide any of a plurality of different roles in response to requests and/or configuration data (e.g., by using different subsets of instructions from among a superset of instructions). For example, each of frameworks 1511, 1512, and 1513 can include a superset of instructions configurable to provide roles for ranking documents in any of English, German, or French. Roles 1521A, 1521B, and 1521C can provide functionality for processing documents in English. Roles 1521A, 1521B, and 1521C can be linked together to form graph 1533 for accelerating document ranking for documents in English.

Figure 16:
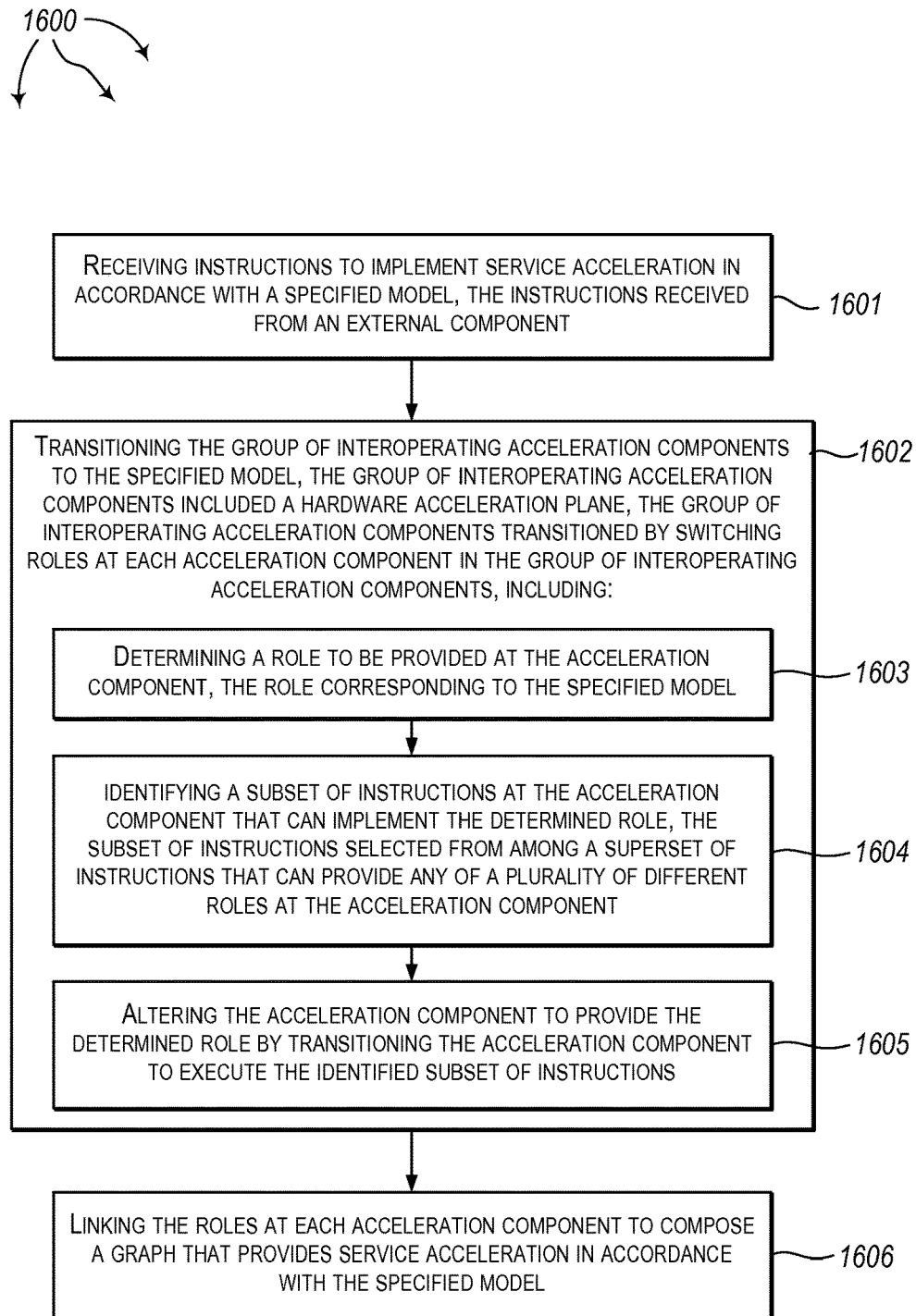
FIG. 16 illustrates a flow chart of an example method for changing between programmed functionality at a group of acceleration components to switch models.

FIG. 16 illustrates a flow chart of an example method 1600 for changing between programmed functionality at a group of acceleration components to switch models. Method 1600 will be described with respect to the components and data of architecture 1500.

Method 1600 includes receiving instructions to implement service acceleration in accordance with a specified model, the instructions received from an external component (1601). For example, graph 1533 can receive model change data 1534. Another component, such as, for example, another acceleration component in hardware acceleration plane 104, a host component in software plane 106, or a higher-level service (e.g., a service manager) can send model change data 1534 to graph 1533. Model change data 1534 can include instructions to change from service acceleration provided by graph 1533 to different service acceleration.

Method 1600 includes transitioning the group of interoperating acceleration components to the specified model, the group of interoperating acceleration components included a hardware acceleration plane, the group of interoperating acceleration components transitioned by switching roles at each acceleration component in the group of interoperating acceleration components (1602). For example, acceleration components 1501, 1502, and 1503 can be transitioned in accordance with model change data 1534 by switching roles at each of acceleration components 1501, 1502, and 1503.

Transitioning the group of interoperating acceleration components to the specified model includes determining a role to be provided at the acceleration component, the role corresponding to the specified model (1603). For example, turning To FIG. 15B, acceleration component 1501 (or a linked host component or service manager) can determine that role 1521B (a role corresponding to model change data 1534) is to be provided at acceleration component 1501. Similarly, acceleration component 1502 (or a linked host component or service manager) can determine that role 1522B (a role corresponding to model change data 1534) is to be provided at acceleration component 1502. Likewise, acceleration component 1503 (or a linked host component or service manager) can determine that role 1523B (a role corresponding to model change data 1534) is to be provided at acceleration component 1503

Transitioning the group of interoperating acceleration components to the specified model includes identifying a subset of instructions at the acceleration component that can implement the role, the subset of instructions selected from among a superset of instructions that can provide any of a plurality of different roles at the acceleration component (1604). For example, a subset of instructions can be identified from among framework 1511 to implement role 1521B. Similarly, a subset of instructions can be identified from among framework 1512 to implement role 1522B. Likewise, a subset of instructions can be identified from among framework 1513 to implement role 1523B.

Transitioning the group of interoperating acceleration components to the specified model includes altering the acceleration component to provide the role by transitioning the acceleration component to execute the identified subset of instructions (1605). For example, acceleration component 1501 can be altered to provide role 1521B by executing an identified subset of instructions from framework 1511. Similarly, acceleration component 1502 can be altered to provide role 1522B by executing an identified subset of instructions from framework 1512. Likewise, acceleration component 1503 can be altered to provide role 1523B by executing an identified subset of instructions from framework 1513. In one aspect, roles at acceleration components are transitioned using the mechanisms described with respect to FIGS. 13A-13E and/or FIGS. 14A-14E.

Method 1600 includes linking the roles at each acceleration component to compose a graph that provides service acceleration in accordance with the specified model (1606). For example, roles 1521B, 1522B, and 1523B can be linked to compose graph 1553. Graph 1553 can provide service acceleration for ranking documents in French.

Thus, in response to model change data 1534 (e.g., a change request or configuration data), framework 1511 can change internally to providing role 1521B, framework 1512 can change internally to providing role 1522B, and framework 1513 can change internally to providing role 1523B. Instructions to change roles at an acceleration component or to change linked roles at a group of acceleration components composed into a graph can originate under a variety of different circumstances, including from an administrator or user, from a management service, availability of particular data types for processing by a model, etc.

In one aspect, roles at a group of interoperating acceleration components are composed into different graphs as sufficient quantities of data for each graph are available. When data for one graph is processed, the service can be switched to another graph.

Figure 17A:
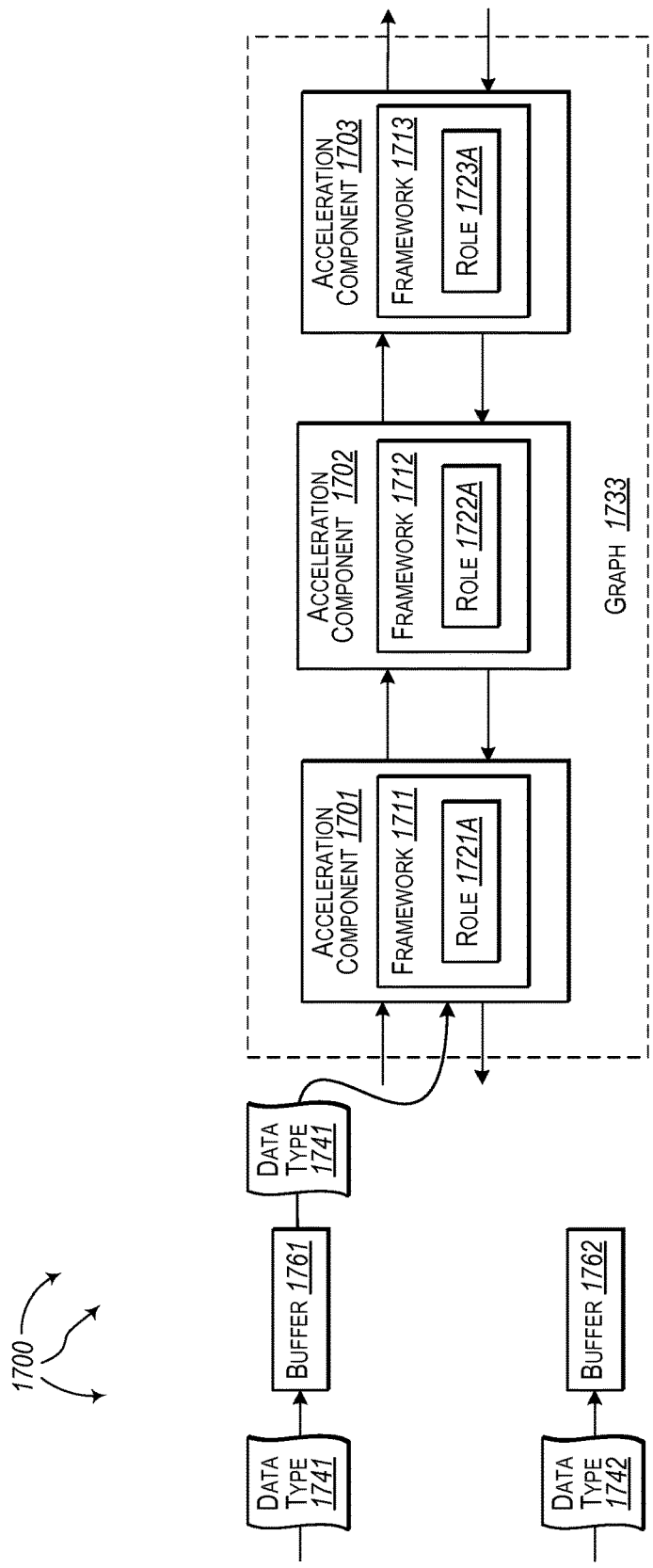
FIGS. 17A and 17B illustrate an example an example architecture that facilitates changing service acceleration provided by a group of interoperating acceleration components.
Figure 17B:
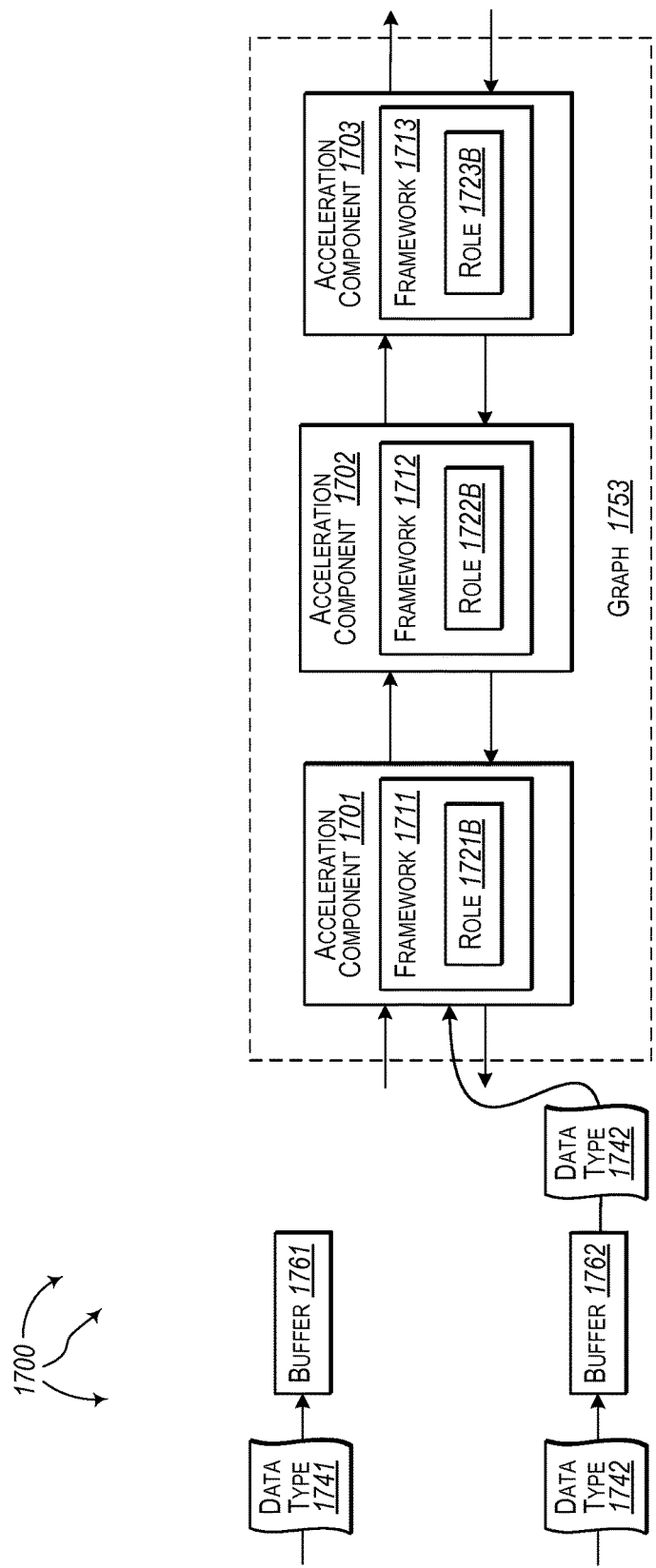

FIGS. 17A and 17B illustrate an example architecture 1700 that facilitates changing service acceleration provided by a group of interoperating acceleration components. As depicted in FIG. 17A, graph 1733 is formed from a group of interoperating acceleration components 1701, 1702, and 1703. Acceleration components 1701, 1702, and 1703 (e.g., FPGAs) can be included in a hardware acceleration plane, such as, hardware acceleration plane 106. The depicted arrangement of acceleration components 1701, 1702, and 1703 is logical.

Each of acceleration components 1701, 1702, and 1703 are programmed with corresponding frameworks 1711, 1712, and 1713. Frameworks 1711, 1712, and 1713 can be configured to change between providing different roles in response to requests and/or configuration data. As depicted, frameworks 1711, 1712, and 1713 are configured to provide roles 1721A, 1722A, and 1723A. Each of roles 1721A, 1722A, and 1723A can be linked together to compose graph 1733 for acceleration a service.

As data of data type 1741 becomes available for processing, the data can be buffered in buffer 1761. Graph 1733 can be designated to process data type 1741. Similarly, as data of data type 1742 becomes available for processing, that data can be buffered in buffer 1762. Graph 1753 can be designated as to process data type 1742.

In operation, data from buffer 1761 can be sent to graph 1733 for processing. After processing a specified amount of data, after a specified time period, when buffer 1761 is empty, or on the occurrence of some other event, a service manager (e.g., similar to management functionality 1122) can instruct acceleration components 1701, 1702, and 1703 to switch from graph 1733 to graph 1753.

Turning to FIG. 17B, in response to instructions from the service manager, framework 1711 can change internally to providing role 1721B, framework 1712 can change internally to providing role 1722B, and framework 1713 can change internally to providing role 1723B. Each of roles 1721B, 1672B, and 1723B can be linked to compose graph 1753. After switching, graph 1753 can process data type 1742 from buffer 1762. Thus, data from buffer 1762 can be sent to graph 1753 for processing. After processing a specified amount of data, after a specified time period, when buffer 1762 is empty, or on the occurrence of some other event, the service manager can instruct components 1701, 1702, and 1703 to switch from graph 1753 to graph 1733 or to some other graph.

Accordingly, different sets of models can be implemented across a group of interoperating acceleration components. Different models can be selected for different functionality. For example, for document ranking, different ranking models can selected based on each query, and can vary for language (e.g. Spanish, English, Chinese), query type, or for trying out experimental models.

When a ranking request comes in, a queue manager can specify which model should be used to score the query. The queue manager can be separate from or integrated into a service manager. The query and document are forwarded to the head of a processing pipeline and placed in a queue in DRAM which contains queries using that model. The queue manager takes documents from each queue and sends them down the processing pipeline. When the queue is empty or when a timeout is reached, the queue manager switches to the next queue. When a new queue (i.e. queries that use a different model) is selected, the queue manager sends a model reload command down the pipeline. The model reload command causes each stage to load the instructions and data needed to evaluate the query with the specified model.

In another aspect, a framework can make the decision to change a role at an acceleration component based on data it receives. For example, referring back to FIG. 14B, acceleration component 1401 can receive data 1481. Data 1481 can be data for processing by role 1406. Thus, in response to receiving data 1481, framework 1403 can transition to providing role 1406. Turning to FIG. 14D, acceleration component 1401 can subsequently receive data 1482. Data 1482 can be data for processing by role 1408. Thus, in response to receiving data 1482, framework 1403 can transition (from providing role 1406) to providing role 1408.

Frameworks at interoperating acceleration components in a graph can make individual decisions to change roles based on data received from neighbor accelerations components. As such, when data corresponding to a designated type of graph is received at a head acceleration component of a graph, the data can trigger a sequence of individual role transitions at each of the interoperating acceleration components. When the sequence of individual role transitions is complete, the graph is transitioned (e.g., from some other type of graph) into the designated type of graph.

As described, reloading a model (i.e., switching between subsets of instructions) at an acceleration component is a less expensive operation relative to reconfiguring or partially reconfiguring an acceleration component (e.g., FPGA) by loading an image file.

In some aspects, a system includes a hardware acceleration plane, a software plane, and a network infrastructure. The hardware acceleration plane includes a configurable fabric of a plurality of acceleration components. The plurality of acceleration components includes a group of interoperating acceleration components. Roles at each acceleration component in the group of interoperating acceleration components are linked together to compose a graph that provides service acceleration for a service.

The software plane includes a plurality of host components running software. The network infrastructure is shared by acceleration components in the hardware acceleration plane and host components in the software plane. The network infrastructure is used by acceleration components to communicate directly with one another. Local links connect acceleration components and host components (e.g., in the same server).

The system also includes one or more computer storage devices having stored thereon computer-executable instructions for changing service acceleration provided by the group of interoperating acceleration components. Changing service acceleration includes receiving instructions to implement service acceleration in accordance with a specified model. The instructions are received from an external component. Changing service acceleration includes transitioning the group of interoperating acceleration components to the specified model. The group of interoperating acceleration components is transitioned by switching roles at each acceleration component in the group of interoperating acceleration components.

Transitioning the group of interoperating acceleration components includes determining a new role to be provided at each acceleration component. The new roles correspond to the specified model. Transitioning the group of interoperating acceleration components includes identifying a subset of instructions at each acceleration component that can implement the new role. The subset of instructions is selected from among a superset of instructions that can provide any of a plurality of different roles at the acceleration component.

Transitioning the group of interoperating acceleration components includes altering each acceleration component to provide the new role by transitioning the acceleration component to execute the identified subset of instructions. Changing service acceleration includes linking the new roles at each acceleration component to compose a new graph that provides service acceleration in accordance with the specified model.

In another aspect, a method for changing service acceleration provided by a group of interoperating acceleration components is performed. Instructions to implement service acceleration in accordance with a specified model are received from an external component. The group of interoperating acceleration components is transitioned to the specified model. The group of interoperating acceleration components is included a hardware acceleration plane. The group of interoperating acceleration components is transitioned by switching roles at each acceleration component in the group of interoperating acceleration components.

Switching roles at an acceleration component includes determining a role to be provided at the acceleration component. The role corresponds to the specified model. Switching roles at an acceleration component includes identifying a subset of instructions at the acceleration component that can implement the role. The subset of instructions is selected from among a superset of instructions that can provide any of a plurality of different roles at the acceleration component.

Switching roles at an acceleration component includes altering the acceleration component to provide the role by transitioning the acceleration component to execute the identified subset of instructions. The roles at each acceleration component are linked to compose a graph that provides service acceleration in accordance with the specified model.

In a further aspect, a computer program product for use at a computer system includes one or more computer storage devices having stored thereon computer-executable instructions that, in response to execution at a processor, cause the computer system to implement a method for changing service acceleration provided by a group of interoperating acceleration components.

The computer program product includes computer-executable instructions that, in response to execution at a processor, cause the computer system to receive instructions to implement service acceleration in accordance with a specified model. The instructions received from an external component. The computer program product includes computer-executable instructions that, in response to execution at a processor, cause the computer system to transition the group of interoperating acceleration components to the specified model. The group of interoperating acceleration components is included a hardware acceleration plane. The group of interoperating acceleration components is transitioned by switching roles at each acceleration component in the group of interoperating acceleration components.

The computer program product includes computer-executable instructions that, in response to execution at a processor, cause the computer system to determine a role to be provided at each acceleration component. The role corresponds to the specified model. The computer program product includes computer-executable instructions that, in response to execution at a processor, cause the computer system to identify a subset of instructions at each acceleration component that can implement the role. The subset of instructions is selected from among a superset of instructions that can provide any of a plurality of different roles at the acceleration component.

The computer program product includes computer-executable instructions that, in response to execution at a processor, cause the computer system to alter each acceleration component to provide the role by transitioning the acceleration component to execute the identified subset of instructions. The computer program product includes computer-executable instructions that, in response to execution at a processor, cause the computer system to link the roles at each acceleration component to compose a graph that provides service acceleration in accordance with the specified model.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method, implemented by a processor, in a data center, the method comprising:

linking a first acceleration component to a second acceleration component in the data center to form a first graph configured to accelerate at least one service in accordance with a first model, wherein the first acceleration component having a first framework comprising a first active instruction block, a second active instruction block, a first inactive instruction block, and a second inactive instruction block, wherein the first framework corresponds to providing a first role corresponding to the at least one service in accordance with the first model, and wherein the second acceleration component having a second framework comprising a third active instruction block, a fourth active instruction block, a third inactive instruction block, and a fourth inactive instruction block, wherein the second framework corresponds to providing a second role corresponding to the at least one service in accordance with the first model; and in response to a model change request received by the first graph: (1) without loading a new image file to the first acceleration component, the first framework switching the first acceleration component from providing the first role to a third role corresponding to the at least one service in accordance with a second model by inactivating at least one of the first active instruction block or the second active instruction block and activating at least one of the first inactive instruction block or the second inactive instruction block, and (2) without loading a new image file to the second acceleration component, the second framework switching the second acceleration component from providing the second role to a fourth role corresponding to the at least one service in accordance with the second model by inactivating at least one of the third active instruction block or the fourth active instruction block and activating at least one of the third inactive instruction block or the fourth inactive instruction block.

2. The method of claim 1, wherein the at least one service is selected from among: document ranking, data encryption, data compression, speech translation, and computer vision.

3. The method of claim 1 further comprising receiving instructions for linking the first acceleration component to the second acceleration component in the data center to form the first graph configured to accelerate the at least one service in accordance with the first model.

4. The method of claim 3, wherein the receiving the instructions for linking the first acceleration component to the second acceleration component in the data center to form the first graph configured to accelerate the at least one service in accordance with the first model comprises receiving an indication that the first graph is to be transitioned to process a specified type of data.

5. The method of claim 1, wherein the model change request is received from a service manager.

6. The method of claim 1, wherein each of the first acceleration component and the second acceleration component is included in a hardware plane.

7. The method of claim 6, wherein the hardware plane comprises a reconfigurable fabric of Field Programmable Gate Arrays (FPGAs).

8. A non-transitory computer program product comprising instructions for implementing a method implemented by a processor, in a data center, the method comprising:
  linking a first acceleration component to a second acceleration component in the data center to form a first graph configured to accelerate at least one service in accordance with a first model, wherein the first acceleration component having a first framework comprising a first active instruction block, a second active instruction block, a first inactive instruction block, and a second inactive instruction block, wherein the first framework corresponds to providing a first role corresponding to the at least one service in accordance with the first model, and wherein the second acceleration component having a second framework comprising a third active instruction block, a fourth active instruction block, a third inactive instruction block, and a fourth inactive instruction block, wherein the second framework corresponds to providing a second role corresponding to the at least one service in accordance with the first model; and
  in response to a model change request received by the first graph: (1) without loading a new image file to the first acceleration component, the first framework switching the first acceleration component from providing the first role to a third role corresponding to the at least one service in accordance with a second model by inactivating at least one of the first active instruction block or the second active instruction block and activating at least one of the first inactive instruction block or the second inactive instruction block, and (2) without loading a new image file to the second acceleration component, the second framework switching the second acceleration component from providing the second role to a fourth role corresponding to the at least one service in accordance with the second model by inactivating at least one of the third active instruction block or the fourth active instruction block and activating at least one of the third inactive instruction block or the fourth inactive instruction block.

9. The non-transitory computer program product of claim 8, wherein the at least one service is selected from among: document ranking, data encryption, data compression, speech translation, and computer vision.

10. The non-transitory computer program product of claim 8, wherein the method further comprising receiving instructions for linking the first acceleration component to the second acceleration component in the data center to form the first graph configured to accelerate the at least one service in accordance with the first model.

11. The non-transitory computer program product of claim 10, wherein the receiving the instructions for linking the first acceleration component to the second acceleration component in the data center to form the first graph configured to accelerate the at least one service in accordance with the first model comprises receiving an indication that the first graph is to be transitioned to process a specified type of data.

12. The non-transitory computer program product of claim 8, wherein the model change request is received from a service manager.

13. The non-transitory computer program product of claim 8, wherein each of the first acceleration component and the second acceleration component is included in a hardware plane.

14. The non-transitory computer program product of claim 13, wherein the hardware plane comprises a reconfigurable fabric of Field Programmable Gate Arrays (FPGAs).

15. A system comprising:
  a hardware acceleration plane including a reconfigurable fabric of a plurality of acceleration components including at least a first acceleration component and a second acceleration component; and
  one or more storage devices having stored thereon computer-executable instructions configured to:
    link a first acceleration component to a second acceleration component in the data center to form a first graph configured to accelerate at least one service in accordance with a first model, wherein the first acceleration component having a first framework comprising a first active instruction block, a second active instruction block, a first inactive instruction block, and a second inactive instruction block, wherein the first framework corresponds to providing a first role corresponding to the at least one service in accordance with the first model, and wherein the second acceleration component having a second framework comprising a third active instruction block, a fourth active instruction block, a third inactive instruction block, and a fourth inactive instruction block, wherein the second framework corresponds to providing a second role corresponding to the at least one service in accordance with the first model; and
    in response to a model change request received by the first graph: (1) without loading a new image file to the first acceleration component, the first framework switch the first acceleration component from providing the first role to a third role corresponding to the at least one service in accordance with a second model by inactivating at least one of the first active instruction block or the second active instruction block and activating at least one of the first inactive instruction block or the second inactive instruction block, and (2) without loading a new image file to the second acceleration component, the second framework switch the second acceleration component from providing the second role to a fourth role corresponding to the at least one service in accordance with the second model by inactivating at least one of the third active instruction block or the fourth active instruction block and activating at least one of the third inactive instruction block or the fourth inactive instruction block.

16. The system of claim 15, wherein the at least one service is selected from among: document ranking, data encryption, data compression, speech translation, and computer vision.

17. The system of claim 15, wherein the one or more computer storage devices further having stored thereon computer-executable instructions configured to receive instructions to link the first acceleration component to the second acceleration component in the data center to form the first graph configured to accelerate the at least one service in accordance with the first model.

18. The system of claim 17, wherein the instructions to link the first acceleration component to the second acceleration component in the data center to form the first graph configured to accelerate the at least one service in accordance with the first model comprising an indication that the first graph is to be transitioned to process a specified type of data.

19. The system of claim 15, wherein the model change request is received from a service manager.

20. The system of claim 15, wherein the reconfigurable fabric of the plurality of acceleration components is a reconfigurable fabric of Field Programmable Gate Arrays (FPGAs).

* * * * *